United States Patent
Sato

(10) Patent No.: US 8,902,462 B1
(45) Date of Patent: Dec. 2, 2014

(54) SYSTEM AND CONTROL METHOD

(71) Applicant: Canon Kabushiki Kaisha, Tokyo (JP)

(72) Inventor: Tetsuya Sato, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/281,602

(22) Filed: May 19, 2014

(30) Foreign Application Priority Data

May 21, 2013 (JP) .................................. 2013-107343

(51) Int. Cl.
*G06F 3/12* (2006.01)
(52) U.S. Cl.
CPC ............ *G06F 3/1275* (2013.01); *G06F 3/1285* (2013.01)
USPC ....................................................... 358/1.15
(58) Field of Classification Search
None
See application file for complete search history.

(56) References Cited

U.S. PATENT DOCUMENTS

| | | | | |
|---|---|---|---|---|
| 6,333,794 B2 * | 12/2001 | Imai et al. | ...................... | 358/1.9 |
| 6,600,569 B1 * | 7/2003 | Osada et al. | ................. | 358/1.12 |
| 7,072,052 B1 * | 7/2006 | Tanahashi et al. | ............. | 358/1.1 |
| 2003/0090716 A1 * | 5/2003 | Umebayashi | ................ | 358/1.15 |
| 2008/0180753 A1 * | 7/2008 | Maeno | ......................... | 358/3.28 |
| 2009/0198394 A1 * | 8/2009 | Kubo | ............................. | 701/19 |

FOREIGN PATENT DOCUMENTS

JP P2004-133926 A 4/2004

\* cited by examiner

*Primary Examiner* — Jeremiah Bryar
(74) *Attorney, Agent, or Firm* — Canon U.S.A., Inc. IP Division

(57) ABSTRACT

A system includes an image processing apparatus, a server apparatus, and an information processing apparatus. The system receives document data from the image processing apparatus. The document data includes identification information to be referred to in identifying a processing flow including sequentially continuing tasks to be executed on the document data. The system extracts the identification information from the received document data and transmits a processing flow execution request that includes the document data to the server apparatus, based on the extracted identification information.

10 Claims, 26 Drawing Sheets

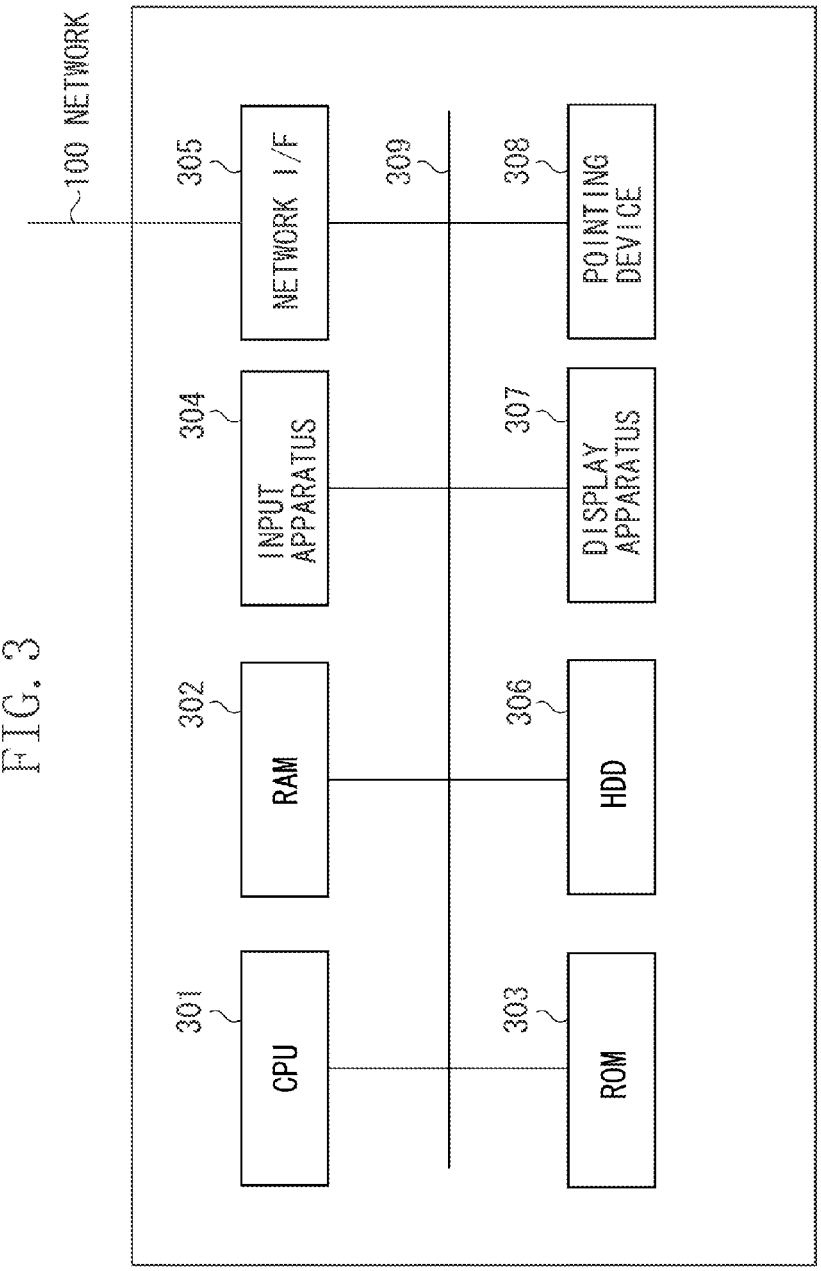

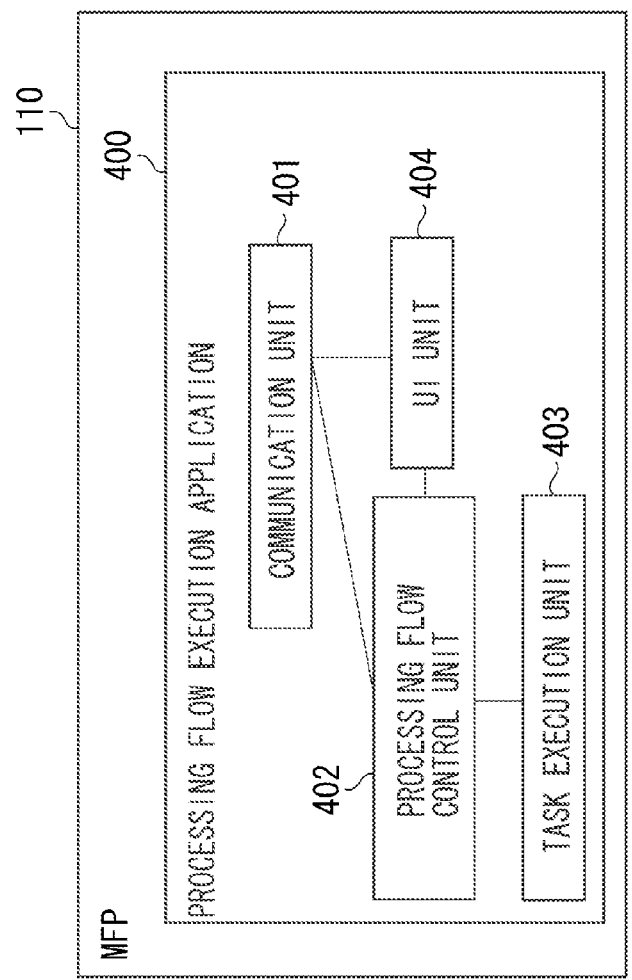

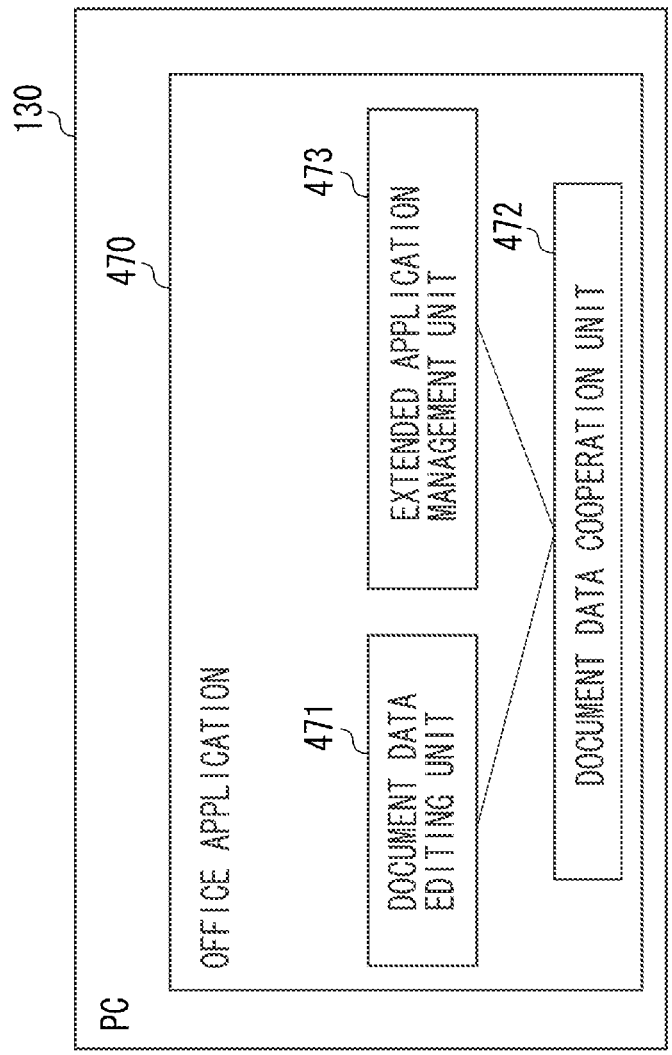

FIG. 6A

PROCESSING FLOW MANAGEMENT LIST 600

| PROCESSING FLOW ID 601 | PROCESSING FLOW NAME 602 | PUBLICATION DESTINATION 603 | PROCESSING FLOW DEFINITION 604 |
|---|---|---|---|
| 75301938 | BUSINESS FORM DATA TRANSMISSION | tsato | 23153.xml |
| 63010219 | WRITING ON BLACKBOARD TRANSMISSION | tsato | 91234.xml |
| 80220412 | WEEKLY REPORT | ookubo | 51298.xml |
| ... | | | ... |

FIG. 6B

STATUS MANAGEMENT LIST 620

| PROCESSING FLOW ID 621 | STATUS 622 |
|---|---|
| 75301938 | IN PROCESS |
| 63010219 | COMPLETED |
| ... | |

FIG. 6C

EXTENDED APPLICATION MANAGEMENT LIST 650

| EXTENDED APPLICATION ID 651 | NAME 652 | PATH 653 | PROVIDER 654 | STARTUP 655 |
|---|---|---|---|---|
| ABCD1234 | PROCESSING FLOW | http://www.flowservice.com/main.aspx | A Inc. | true |
| ... | ... | ... | ... | ... |

FIG. 6D

EXTENDED APPLICATION MANAGEMENT LIST 670

| EXTENDED APPLICATION ID 671 | NAME 672 | PATH 673 | PROVIDER 674 | STARTUP 675 |
|---|---|---|---|---|
| ABCD1234 | PROCESSING FLOW | http://www.flowservice.com/main.aspx | A Inc. | true |
| EFGH5678 | COUNTING | http://www.test.com/main.aspx | B Inc. | false |
| ... | ... | ... | ... | ... |

FIG. 10

```
                                                                    900
<?xml version="1.0" encoding="UTF-8"?>
<JobScript name="BUSINESS FORM DATA TRANSMISSION" user="tsato" id="75301938">
 <Scan>
  <Settings>
   <DocumentSize>AUTO</DocumentSize>
   <ColorMode>FullColor</ColorMode>
   <Resolution>600x600</Resolution>
   <CopyRatio>100</CopyRatio>
  </Settings>
 </Scan>
 <Send>
  <Settings>
   <SMBPath>\\192.168.xx.xx\abc\...</SMBPath>
   <InText>75301938</InText>
  </Settings>
 </Send>
 <Imaging path="/convert/PDF">
   ...
 </Imaging>
 <Connector>
  <Settings>
   <Name>http://www.DocumentService150/...<Name>
   <path>/user01</path>
   <FileName>REFERENCE FOR MEETING</FileName>
   <User>tsato</User>
   <Password>xxxxxx</Password>
  </Settings>
 </Connector>
</JobScript>
```

901 — JobScript line
902 — name
903 — user
904 — id
905 — Scan
906 — Send
907 — SMBPath
908 — InText
909 — Imaging
910 — Connector

FIG. 13

```
<?xml version="1.0" encoding="UTF-8"?>
<document>
<body>
<p>
...
<t>JOURNAL</t>
</p>
    .    .    .
<jobScriptId>75301938</jobScriptId>
</body>
</document>
```

1101
1102
1103
1100

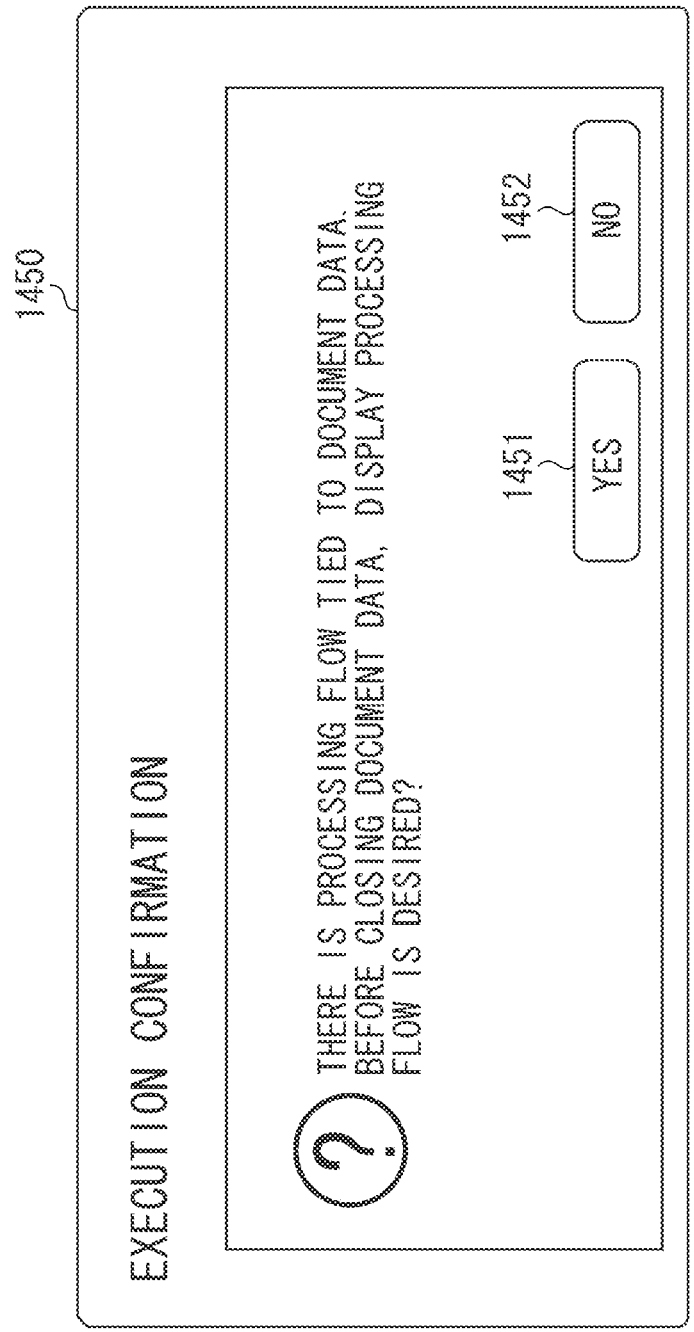

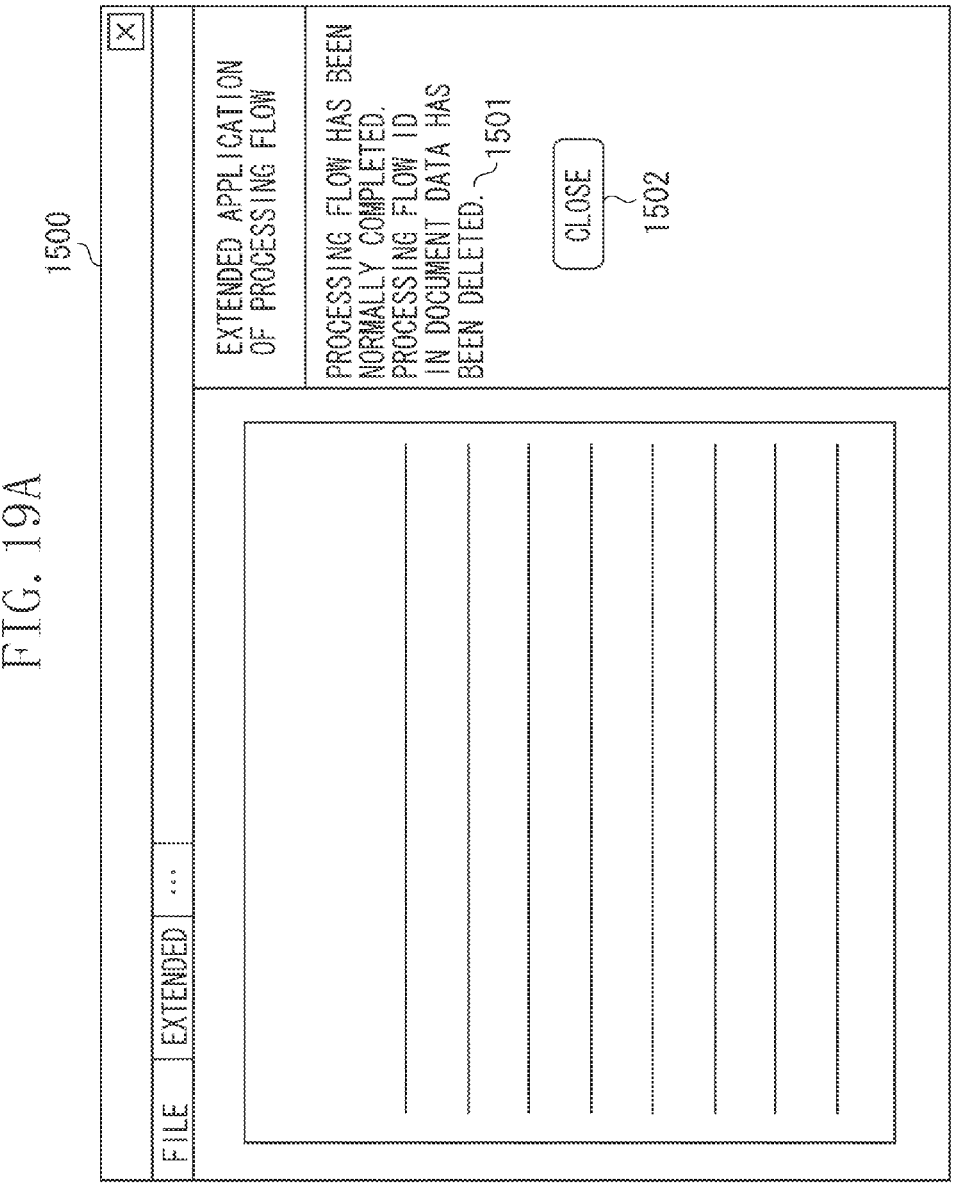

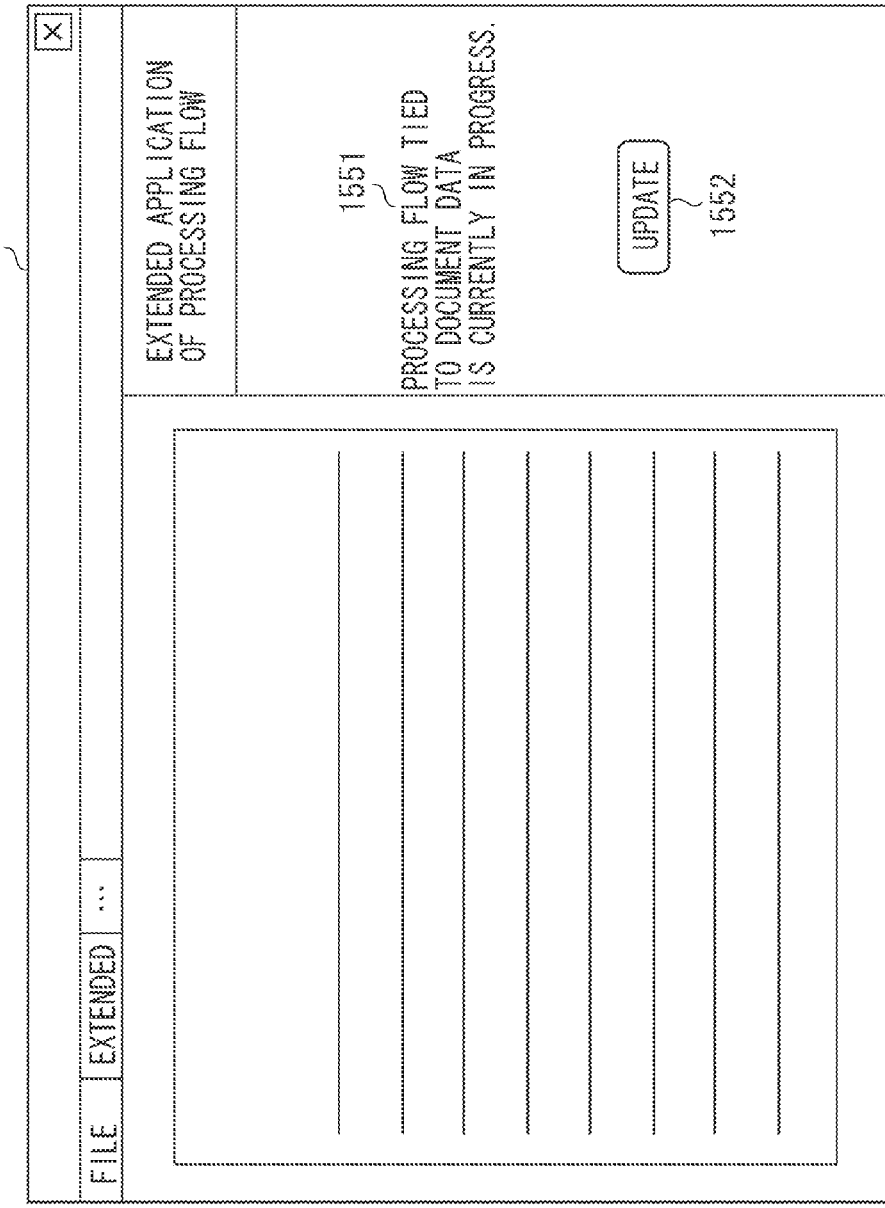

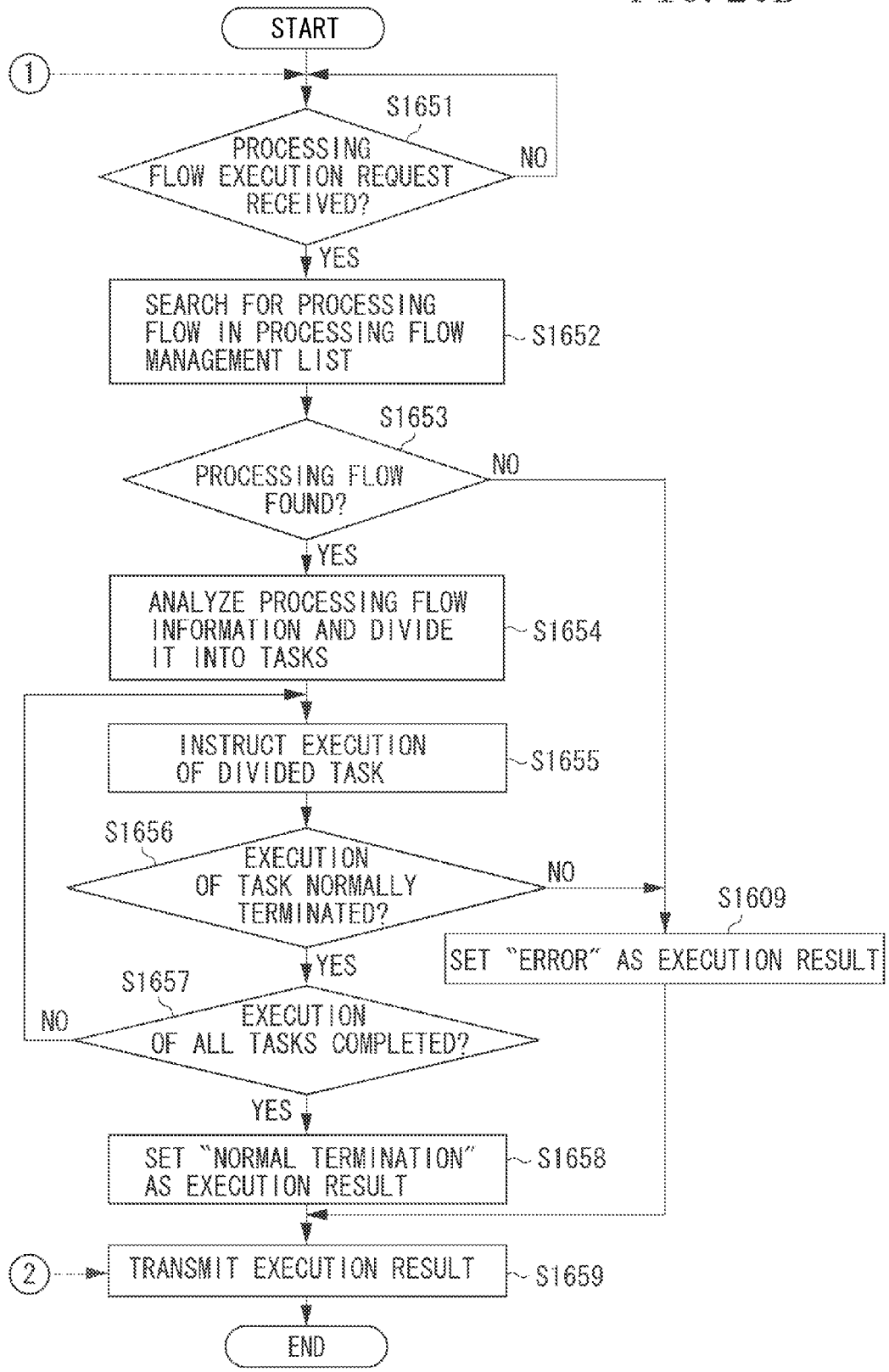

SYSTEM AND CONTROL METHOD

BACKGROUND

1. Field

The present subject matter relates to a system and a control method.

2. Description of Related Art

It is conventionally feasible for a system to realize a plurality of pieces of processing according to an instruction. As discussed in Japanese Laid-Open Patent Application No. 2004-133926, when a plurality of pieces of processing is described in an instruction, a conventional system performs the plurality of pieces of processing according to a described instruction.

SUMMARY

In this case, it is presumed that the system preliminarily defines a processing flow including a plurality of sequentially combined tasks, each being executable on document data, and executes a processing flow selected by a user on the document data selected by the user. The task is, for example, scanning a document to be processed, performing a printing based on document data, or transmitting the document data by means of an appropriate communication tool (e.g., electronic mail, facsimile, or file).

For example, it is presumed that a multi function peripheral (MFP) scans a document and transmits scanned document data to a personal computer (PC). The PC performs image processing (including format conversion) on the document data and then registers converted document data to a document management system. Hereinafter, in the following description, any sequentially combined plurality of tasks is defined as the processing flow.

On the other hand, in an example use case, a user of the PC may perform a work on document data received from the MFP and may want to execute a processing flow on the document data having been subjected to the user work. For example, after scanned document data has been subjected to optical character recognition (OCR) processing, a user may confirm or correct an OCR result and then register the OCR result in the document management system.

In such a case, the above-mentioned system requires the user to select the OCR processed document data and the processing flow. On the other hand, the above-mentioned use case is not presumed in Japanese Patent Application Laid-Open No. 2004-133926. Therefore, it is infeasible to realize the above-mentioned processing.

The present subject matter is directed to a system that receives document data including identification information to be referred to in identifying a processing flow from an image processing apparatus and requests executing the processing flow based on the identification information included in the document data.

An aspect of the present subject matter provides a system that includes an image processing apparatus, a server apparatus, and an information processing apparatus. The image processing apparatus includes an embedding unit configured to embed identification information in document data read by the image processing apparatus. The identification information can be referred to in identifying a processing flow including a plurality of pieces of processing to be performed on the document data. The server apparatus includes a management unit configured to manage list information that associates the identification information with processing flow information corresponding to the processing flow. The information processing apparatus includes a reception unit configured to receive the document data in which the identification information is embedded from the image processing apparatus, and a transmission unit configured to transmit an execution request of the processing flow that includes the identification information and the document data, to the server apparatus. The server apparatus further includes an execution unit configured to execute a processing flow that corresponds to processing flow information associated with the identification information included in the execution request, of the processing flow information included in the list information.

Further features of the present subject matter will become apparent from the following description of exemplary embodiments with reference to the attached drawings.

BRIEF DESCRIPTION OF THE DRAWINGS

FIG. 3 illustrates an example of a hardware configuration that is applicable to each server apparatus or to a PC.

FIGS. 4A, 4B, and 4C illustrate an example of software configurations of the MFP, a processing flow management server apparatus, and the PC.

FIGS. 6A to 6D illustrate an example of management lists that can be managed by various management units.

FIG. 10 illustrates an example of a processing flow definition file.

FIG. 13 illustrates an example of document data.

FIG. 18 illustrates an example of a message box.

FIGS. 19A, 19B, and 19C illustrate an example (Part V) of the UI that can be displayed by the PC.

FIG. 20, comprising FIG. 20A and FIG. 20B, is a flowchart illustrating an example (Part II) of the processing that can be performed by the processing flow management server apparatus.

DETAILED DESCRIPTION

Various exemplary embodiments, features, and aspects of the subject matter will be described in detail below with reference to the drawings.

First, a system according to a first exemplary embodiment is described in detail below.

(System Configuration)

Figure 1:
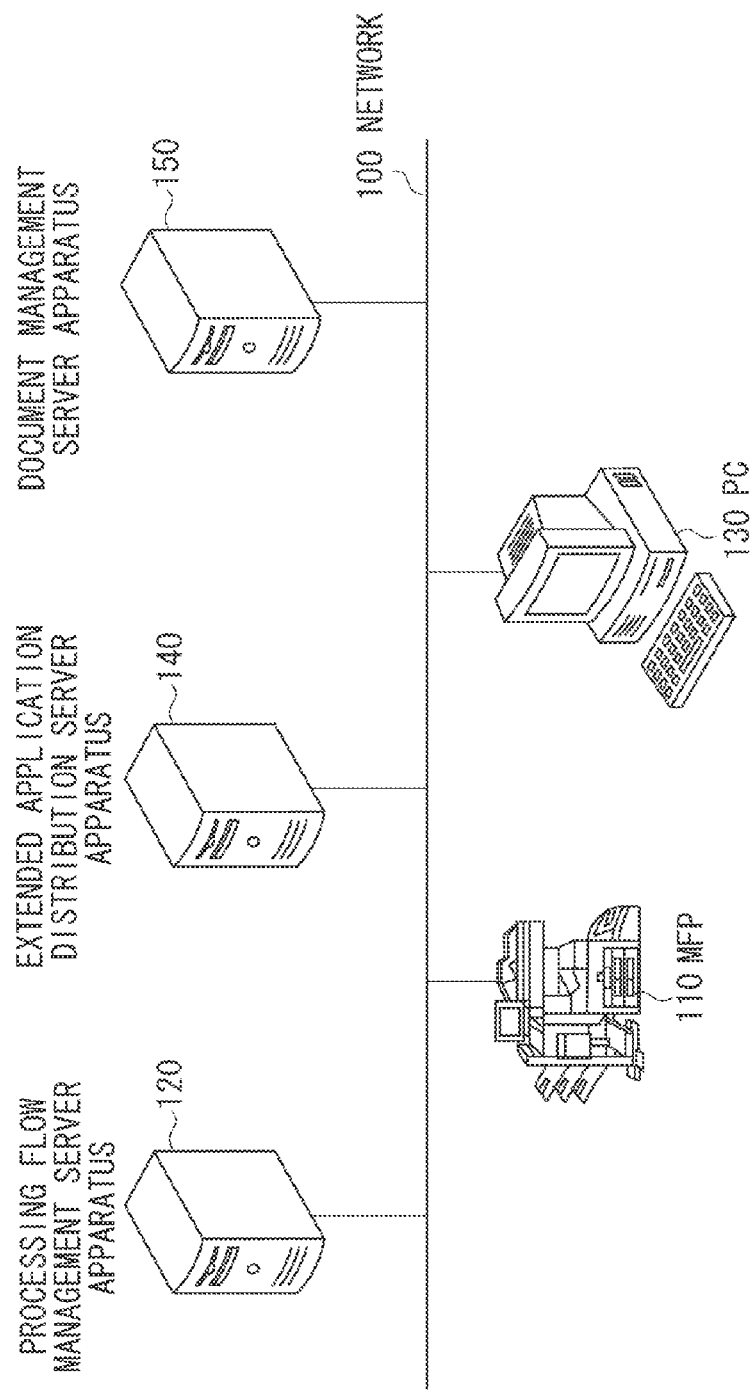
FIG. 1 illustrates an example of a system configuration of a system according to an exemplary embodiment.

FIG. 1 illustrates an example of a system configuration of an image processing system according to the present exemplary embodiment.

The system illustrated in FIG. 1 includes an MFP 110, a processing flow management server apparatus 120, a PC 130, an extended application distribution server apparatus 140, and a document management server apparatus 150, which are connected via a network 100.

The network 100 constitutes an infrastructure that enables each apparatus to communicate with each other. For example, the network 100 is Intranet, a private internet, or any other network system.

The MFP 110 has a copy function. Further, the MFP 110 has a data transmission function. More specifically, the MFP 110 can read an image of a document to be processed and can transmit document data obtained through the reading processing to a designated apparatus accessible via the network 100, using FTP protocols and SMB protocols. In the following description, the type of protocols to be used in transmitting the document data is SMB. However, the type of protocols to be used in transmitting the document data is not limited to a specific type.

Further, the MFP 110 can generate an electronic mail including an attachment file of document data and can transmit the generated electronic mail via an electronic mail server apparatus. Further, the MFP 110 has a function of embedding identifier (identification information) in document data to uniquely identify each processing flow. Further, although an image processing apparatus causes the MFP 110 to perform various types of processing on document data in the following description, any other appropriate information processing apparatus (e.g., a PC) can perform the similar processing on the document data.

A processing flow management server apparatus 120 is a server apparatus that can integrally manage information relating to a processing flow of sequentially continuing tasks (hereinafter, simply referred to as "processing flow information"). The processing flow management server apparatus 120 has a function of identifying a processing flow to be executed based on currently managing processing flow information and the identification information.

The PC 130 has a program execution environment in which an office application is executed and a program of a web browser (e.g., an internet browser, a WWW browser, or any other browser applicable to World Wide Web) is executed. The office application is described in detail below with reference to FIG. 4C. The PC described in the present exemplary embodiment can be replaced by a tablet terminal or a smartphone in which the program execution environment is incorporated. Further, the PC 130 has a function of extracting identification information from document data if the MFP 110 embeds the identification information in the document data. The PC 130 is an example of the information processing apparatus.

The extended application distribution server apparatus 140 can register and manage extended applications created by many developers. Further, the extended application distribution server apparatus 140 can provide an extended application to an office application according to the present exemplary embodiment. An example relationship between the office application and the extended application is described in detail below with reference to FIG. 7.

The document management server apparatus 150 is a server apparatus that can manage document data. The document management server apparatus 150 can provide various services to an external apparatus. For example, the services that can be provided by the document management server apparatus 150 include registration, referring, and deletion processing to be performed on document data.

In the above-mentioned system, the PC 130 receives document data including embedded identification information from the MFP 110, and extracts the identification information from the received document data. Further, the PC 130 can transmit the extracted identification information and the document data to the processing flow management server apparatus 120. The processing flow management server apparatus 120 identifies a processing flow based on the identification information received from the PC 130 and the currently managing processing flow information. The processing flow management server apparatus 120 executes the identified processing flow on the received document data.

In the present exemplary embodiment, the total number of the above-mentioned apparatuses is not limited to a specific value.

(Hardware Configuration)

Figure 2:
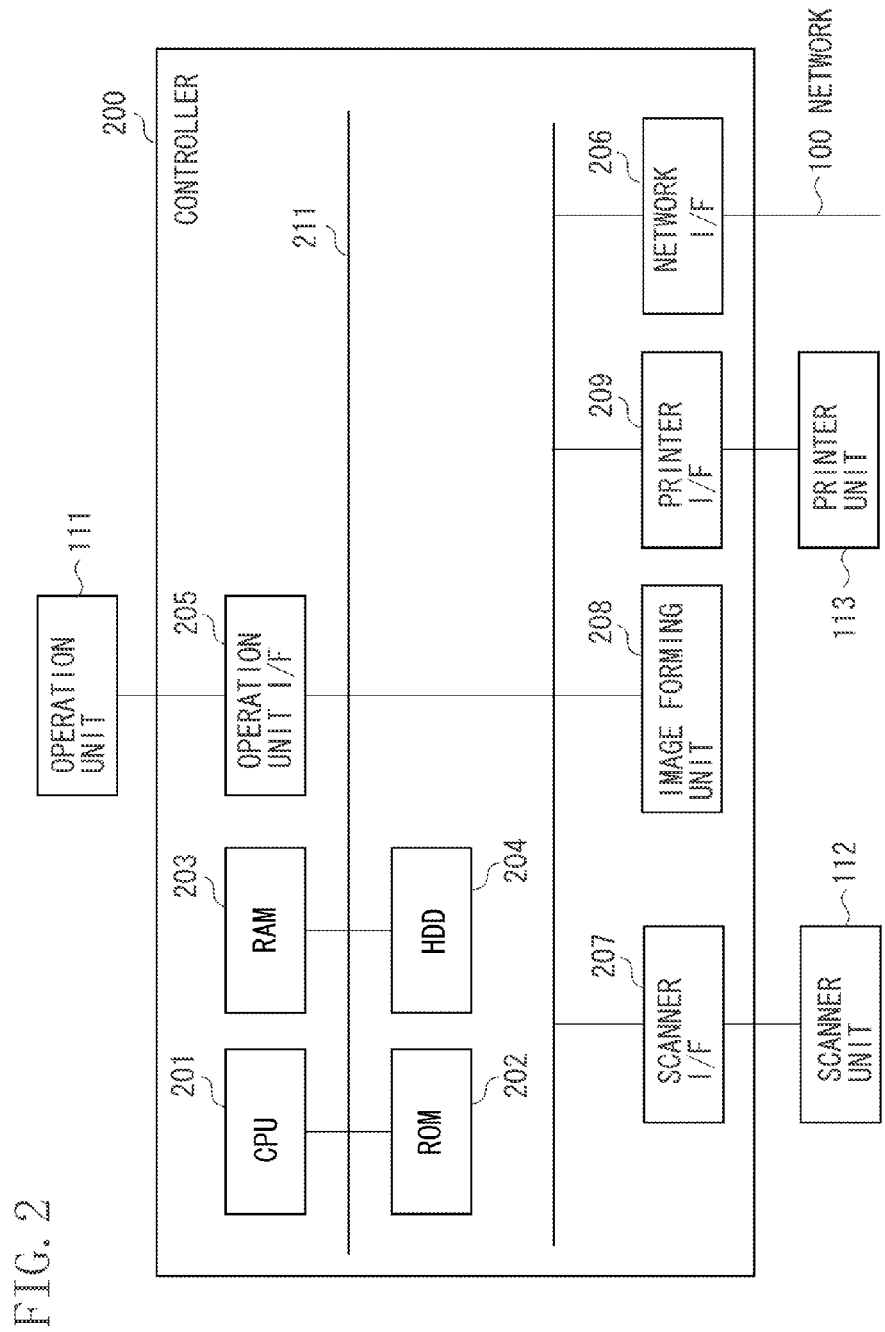
FIG. 2 illustrates an example of a hardware configuration of an MFP.

FIG. 2 illustrates an example of a hardware configuration of the MFP 110.

The MFP 110 includes a scanner unit 112 (i.e., an image input device), a printer unit 113 (i.e., an image output device), a controller 200 that performs various control processing to be performed by the MFP 110, and an operation unit 111, as illustrated in FIG. 2.

The scanner unit 112 is a device that can read an image of a document to be processed and generate image data. More specifically, when a document to be processed is set (or placed) on a document feeder, the controller 200 transmits a document reading instruction to the scanner unit 112. In response to the document reading instruction, the scanner unit 112 feeds document sheets to be processed successively (i.e., one by one) from the document feeder and performs a document reading operation.

In the case, the document reading method is not limited to an automatic feeding method that can be performed by the document feeder. For example, as another document reading method, it is useful to perform scanning of a document to be processed while moving an exposure section in a state where the document to be processed is placed on a glass surface.

The printer unit 113 is an image forming device that can form an image on a paper based on image data received from the controller 200. The image forming method according to the present exemplary embodiment is not limited to an electrophotography type using a photosensitive drum or a photosensitive belt. For example, an injection type is employable.

The controller 200 is electrically connected to each of the operation unit 111, the scanner unit 112, and the printer unit 113. On the other hand, the controller 200 is connected to the network 100 via a network interface (I/F) 206. More specifically, the controller 200 is connected to another device via the network 100. Therefore, the MFP 110 can perform communications based on HTTP protocols.

A central processing unit (CPU) 201 can access various devices that are currently connected, based on a control program stored in a read only memory (ROM) 202. The CPU 201 can integrally control other devices when these devices access the CPU 201. Further, the CPU 201 can integrally control various types of processing when they are performed in the controller 200. The processing to be controlled by the CPU 201 includes executing a program that can realize the processing of each flowchart described below.

The ROM 202 is a memory that stores an apparatus boot program.

A random access memory (RAM) 203 is a system work memory that works for the CPU 201 when the CPU 201 is operating. The RAM 203 is also a memory that can temporarily store image data. The RAM 203 includes a first memory area in which the stored content is continuously retained by a backup power source even after a main apparatus power source is turned off and a second memory area in which the stored content is deleted when the power source is turned off.

A hard disk drive (HDD) 204 can store system software programs and image data.

An operation unit interface (I/F) 205 is an interface unit that connects a system bus 211 to the operation unit 111. The operation unit I/F 205 can receive image data to be displayed on the operation unit 111 from the system bus 211 and output the received image data to the operation unit 111. Further, the operation unit I/F 205 can output input information to the system bus 211, when the information is input via the operation unit 111.

The network I/F 206 is connected to the network 100 and the system bus 211 to perform information input/output processing.

A scanner I/F 207 can perform correction, modifying, and editing processing on image data when the image data is received from the scanner unit 112. The scanner I/F 207 has a function of determining whether the received image data is originated from a color document to be processed, a monochrome document to be processed, a text document to be processed, or a photo document to be processed.

An image forming unit 208 can perform direction conversion, image compression, and image expansion processing on image data. Further, the image forming unit 208 can obtain a composite image based on a plurality of images stored in the HDD 204.

A printer I/F 209 can receive image data transmitted from the image forming unit 208 and can perform image forming processing on the image data with reference to attribute data attached to the received image data. The printer I/F 209 can output the image data, if the image forming processing has been completed, to the printer unit 113.

In the present exemplary embodiment, the MFP 110 is a network MFP that performs a user interface (UI) display operation. However, if it is possible, the MFP 110 can be replaced by any other image processing apparatus, such as a general computer that is associated with a general scanner and a general printer.

FIG. 3 illustrates an example of a hardware configuration that is applicable to each of the processing flow management server apparatus 120, the PC 130, the extended application distribution server apparatus 140, and the document management server apparatus 150.

In FIG. 3, a CPU 301, a RAM 302, a ROM 303, a network I/F 305, and a hard disk drive (HDD) 306 are connected to each other via a system bus 309 so that these functional components can communicate with each other.

Further, a display apparatus 307 (e.g., a cathode ray tube (CRT)), an input apparatus 304 (e.g., a keyboard), and a pointing device 308 (e.g., a mouse) are connected to each other via the system bus 309 so that these functional components can communicate with each other.

An operating system (or any other control program) is stored in the ROM 303 or the HDD 306.

The CPU 301 has a software configuration that is functionally operable as a computer that can execute the control program if the program is loaded into the RAM 302 from the ROM 303 or the HDD 306.

Further, the CPU 301 can cause the display apparatus 307 to display various types of information. Further, the CPU 301 can receive user instructions via the input apparatus 304 and the pointing device 308. Further, the CPU 301 can communicate with another apparatus connected to the network 100, which is accessible via the network I/F 305.

(Software Configuration)

FIG. 4A illustrates an example of a software configuration (i.e., a processing unit) of the MFP 110. The CPU 201 can execute a program when the program is loaded into the RAM 203 from the HDD 204 included in the MFP 110. Accordingly, the CPU 201 can function as the processing unit (i.e., the software configuration) of the MFP 110 and can realize the processing of each flowchart relating to the MFP 110. Further, the CPU 201 can realize the sequence processing that can be performed by the MFP 110. Alternatively, a part or the whole of the processing unit of the MFP 110, the processing of each flowchart relating to the MFP 110, and the sequence processing that can be performed by the MFP 110 can be constituted by a dedicated hardware.

The MFP 110 includes a processing flow execution application 400. The processing flow execution application 400 includes a communication unit 401, a processing flow control unit 402, a task execution unit 403, and a UI unit 404.

The communication unit 401 can communicate with a communication unit of each apparatus via the network I/F 206. The communication unit 401 can transmit a processing flow execution request to a communication unit 421 of the processing flow management server apparatus 120. Further, the communication unit 401 can receive a list of processing flow information from the communication unit 421 of the processing flow management server apparatus 120 and send the received list to the processing flow control unit 402.

The processing flow control unit 402 can analyze the processing flow information. The processing flow control unit 402 can acquire details about the processing flow information from the processing flow management server apparatus 120 via the communication unit 401 in response to a processing flow execution instruction from the UI unit 404. Then, the processing flow control unit 402 can analyze the acquired processing flow information and divide processing flow information into individual tasks. Further, the processing flow control unit 402 can transmit a notification to the task execution unit 403 to perform the processing in such a way as to execute individual tasks according to the order designated by the processing flow information.

The task execution unit 403 can execute each task when the task is received from the processing flow control unit 402.

For example, the tasks to be performed by the task execution unit 403 include scanning of a document to be processed, printing of document data, and transmission of the document data by means of an electronic mail, a facsimile, or a file.

The UI unit 404 can display images on the operation unit 111 via the operation unit I/F 205 and can process user instructions input via the operation unit 111. The UI unit 404 can display a button icon that is operable to execute the processing flow indicated by the processing flow information acquired from the processing flow management server apparatus 120 via the communication unit 401. Further, if the UI unit 404 detects an operation of a user who presses the displayed button via the operation unit 111, the UI unit 404 sends a processing flow execution instruction to the processing flow control unit 402.

Figure 4B:
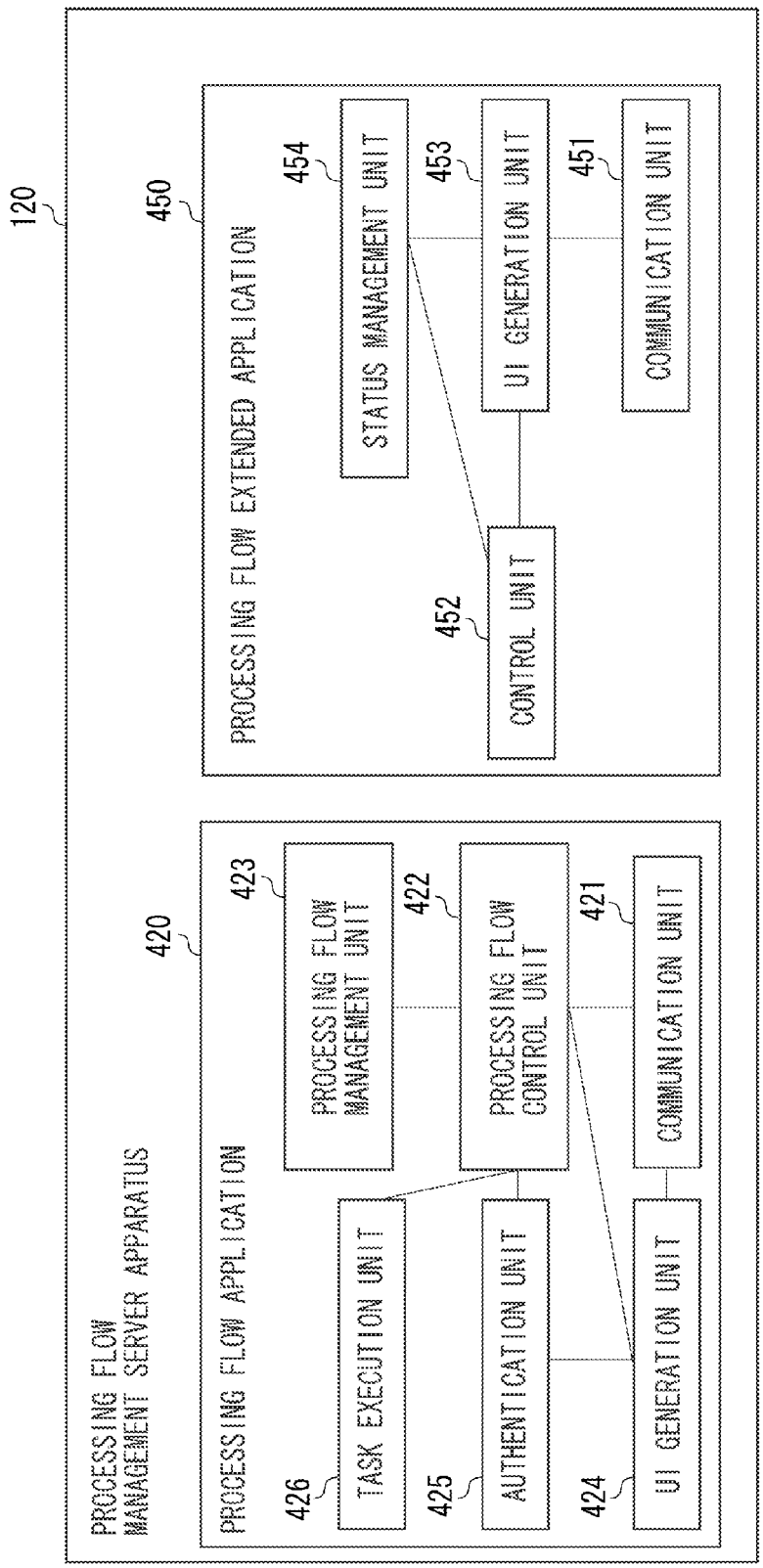

FIG. 4B illustrates an example of a software configuration (i.e., a processing unit) of the processing flow management server apparatus 120.

The CPU 301 of the processing flow management server apparatus 120 can execute a program when the program is loaded into the RAM 302 from the HDD 306 included in the processing flow management server apparatus 120. Accordingly, the CPU 301 of the processing flow management server apparatus 120 can function as processing unit (i.e. the software configuration) of the processing flow management server apparatus 120 and can realize the processing of each flowchart relating to the processing flow management server apparatus 120. Similarly, the CPU 301 of the processing flow management server apparatus 120 can realize the processing to be performed by the processing flow management server apparatus 120 in sequence processing described below.

The processing flow management server apparatus 120 includes a processing flow application 420 and a processing flow extended application 450. In the present exemplary embodiment, the processing flow application 420 and the processing flow extended application 450 are installed on the same server apparatus. However, the processing flow application 420 and the processing flow extended application 450 can be installed on different server apparatuses. Further, in the present exemplary embodiment, the processing flow application 420 and the processing flow extended application 450 are independent applications. However, as another configuration, the processing flow application 420 can be configured to incorporate the function of the processing flow extended application 450.

The processing flow application 420 includes processing flow management, generation, and execution functions. The processing flow application 420 includes the communication unit 421, a processing flow control unit 422, a processing flow management unit 423, a UI generation unit 424, an authentication unit 425, and a task execution unit 426.

The communication unit 421 can communicate with a communication unit of each apparatus via the network I/F 305. The processing flow control unit 422 is a software module that can control processing relating to the processing flow. The processing flow control unit 422 can acquire processing flow information via the processing flow management unit 423. Further, the processing flow control unit 422 can analyze the acquired processing flow information and divide the processing flow information into individual tasks. Further, the processing flow control unit 422 can transmit a notification to the task execution unit 426 to cause the processing flow application 420 to perform the processing in such a way as to execute individual tasks according to the order designated by the processing flow information.

Further, the processing flow control unit 422 can perform editing and modifying processing on the acquired processing flow information. The processing flow management unit 423 is a software module that can manage a processing flow management list 600, which is described below. The processing flow management list 600 is described in detail below with reference to FIG. 6A. In response to an instruction from the processing flow control unit 422, the processing flow management unit 423 acquires processing flow information from the processing flow management list 600. Further, in response to an instruction from the processing flow control unit 422, the processing flow management unit 423 registers the processing flow information in the processing flow management list 600.

The UI generation unit 424 can receive a request from the web browser operating on the PC 130 via the communication unit 421 and can generate a processing flow generation screen using a Hyper Text Markup Language (html) file. The UI generation unit 424 transmits the generated screen to the web browser operating on the PC 130 via the communication unit 421.

The authentication unit 425 is a software module that can authenticate the processing flow application 420. The authentication unit 425 can manage authentication information (e.g., user name and password) usable to log in the processing flow application 420. More specifically, in determining whether the authentication information is usable to log in the processing flow application 420, the authentication unit collates the authentication information received from the web browser operating on the PC 130 with authentication information managed by the authentication unit 425.

The task execution unit 426 can execute each task if it is sent from the processing flow control unit 422. For example, the task that can be executed by the task execution unit 426 is image processing (including format conversion) or registration of document data in the document management server apparatus. It is not always necessary for the task execution unit 426 to execute actual processing of each task. For example, the task execution unit 426 can execute the task by requesting an image processing web service, which is available from an external server apparatus, to process document data, and receive the processed document data from the image processing web service.

The processing flow extended application 450 is a web application that includes a communication unit 451, a control unit 452, a UI generation unit 453, and a status management unit 454. The processing flow extended application 450 can perform various types of processing in response to each request from an office application 470.

The communication unit 451 is a software module that can communicate with the communication unit of each apparatus via the network I/F 305.

The control unit 452 can request the processing flow application 420 to search for and execute a processing flow. Further, the control unit 452 can request the status management unit 454 to confirm the status of each processing flow.

The UI generation unit 453 is a software module that can generate screen data to be displayed on the office application 470. The screen data is a data (e.g., html file) that is described to display text and image data on the UI. Further, the UI generation unit 453 can add a processing command to the screen data, using JavaScript (registered trademark). The processing command corresponds to document data to be displayed by the office application 470.

The status management unit 454 is a software module that can manage a status management list 620, which is described below. The status management list 620 is described in detail below with reference to FIG. 6B.

FIG. 4C illustrates an example of a software configuration (i.e., a processing unit) of the PC 130. The CPU 301 of the PC 130 executes a program loaded into the RAM 302 from the HDD 306 included in the PC 130. Accordingly, the CPU 301 of the PC 130 can function as the processing unit of the PC 130 and can realize the processing of each flowchart relating to the PC 130, which is described in detail below.

The PC 130 includes the office application 470. The office application 470 has a document data editing function. Further, the office application 470 is configured to extend the document editing function by adding an extended application installed as a web application.

The office application 470 includes a document data editing unit 471, a document data cooperation unit 472, and an extended application management unit 473.

The document data editing unit 471 is a software module that has the document data editing function. The document data editing unit 471 detects a user operation directed to document data and performs predetermined processing on the document data according to the user operation. Further, the document data editing unit 471 can edit the document data in response to an instruction from the document data cooperation unit 472 and can send a partial data included in the document data to the document data cooperation unit 472.

The document data cooperation unit 472 can analyze each processing command if the command is received from the extended application management unit 473 and can instruct the document data editing unit 471 to perform processing relating to the document data. Further, the document data cooperation unit 472 can receive data from the document data editing unit 471 and send the received data to the extended application management unit 473.

The extended application management unit 473 is a software module that can execute an extended application. The extended application management unit 473 can communicate with the web application (i.e., the substance of the extended application) in executing the extended application. Further, the extended application management unit 473 can manage an extended application management list 650 that is described in detail below. The extended application management list 650 is described in detail below with reference to FIG. 6C.

Figure 5A:
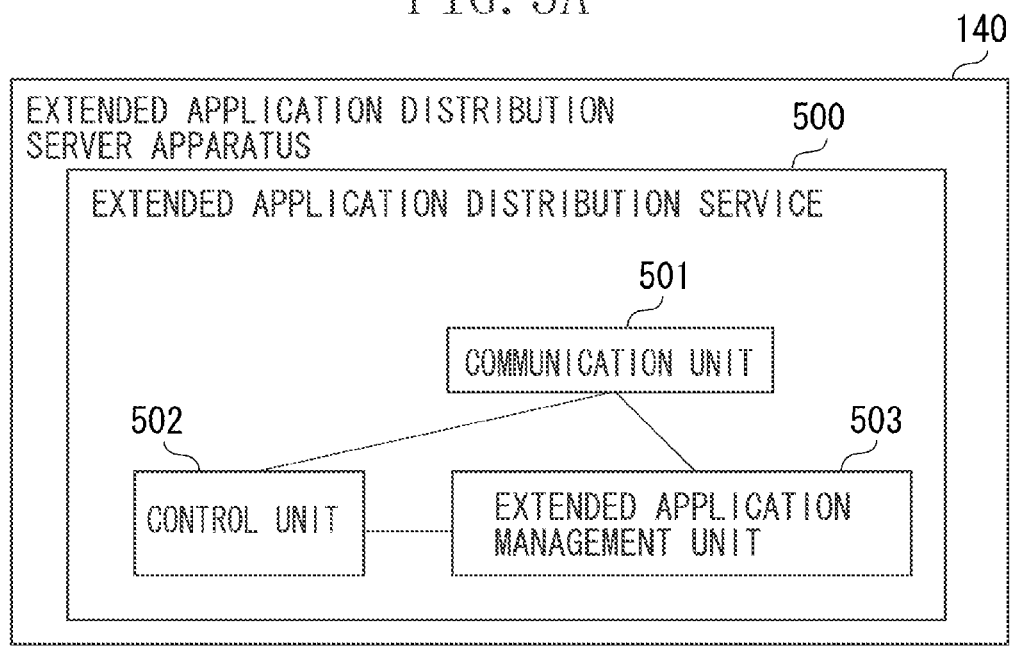
FIGS. 5A and 5B illustrates an example of software configurations of an extended application distribution server apparatus and a document management server apparatus.

FIG. 5A illustrates an example of a software configuration (i.e., a processing unit) of the extended application distribution server apparatus 140.

The CPU 301 of the extended application distribution server apparatus 140 executes a program, if the program is loaded into the RAM 302 from the HDD 306 of the extended application distribution server apparatus 140. Accordingly, the CPU 301 of the extended application distribution server apparatus 140 can function as the processing unit (i.e. the software configuration) of the extended application distribution server apparatus 140. Similarly, the CPU 301 of the extended application distribution server apparatus 140 can realize the processing of each flowchart relating to the extended application distribution server apparatus 140, as described below.

The extended application distribution server apparatus 140 includes an extended application distribution service 500. The extended application distribution service 500 is a service that can register and manage extended applications created by many developers. The office application 470 can access the extended application distribution service 500 of the extended application distribution server apparatus 140 to search and acquire various extended applications.

A communication unit 501 can communicate with the communication unit of each apparatus via the network I/F 305. A control unit 502 can receive a request from the office application 470 via the communication unit 501 and can perform predetermined processing according to the request. The request is, for example, a request of listing, searching, and downloading an extended application. Further, the control unit 502 can transmit a response including a processing result to the office application 470 via the communication unit 501.

An extended application management unit 503 is a software module that can manage an extended application management list 670 that is described in detail below. The extended application management list 670 is described in detail below with reference to FIG. 6D.

Figure 5B:
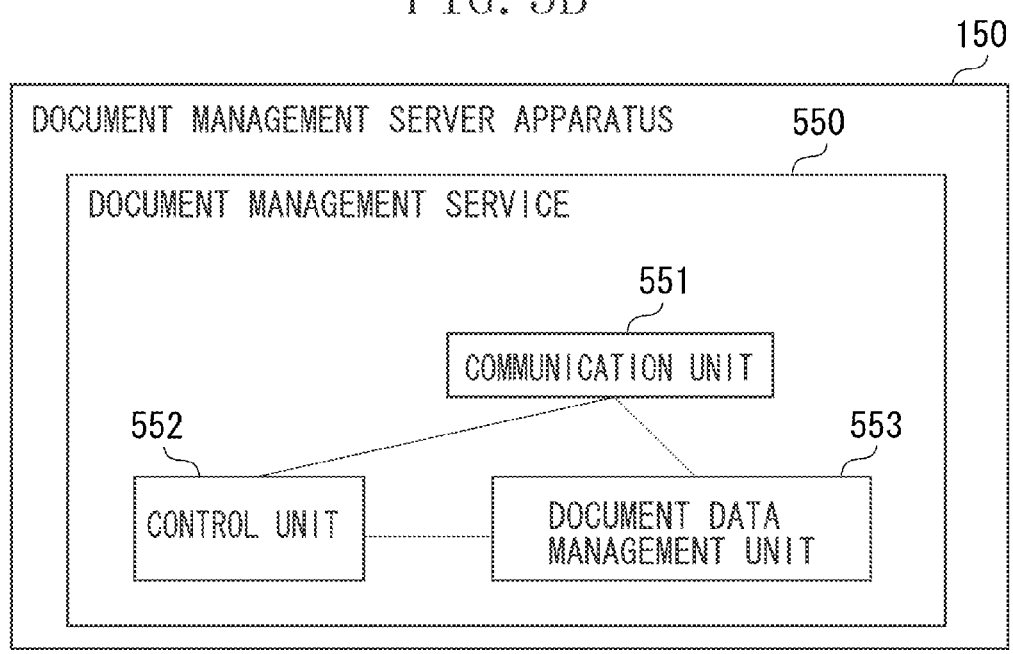

FIG. 5B illustrates an example of a software configuration (i.e., a processing unit) of the document management server apparatus 150.

The CPU 301 of the document management server apparatus 150 executes a program, if the program is loaded into the RAM 302 from the HDD 306 of the document management server apparatus 150. Accordingly, the CPU 301 of the document management server apparatus 150 can function as the processing unit (i.e., the software configuration) of the document management server apparatus 150.

The document management server apparatus 150 includes a document management service 550. The document management service 550 is a web application. The document management service 550 includes a communication unit 551, a control unit 552, and a document data management unit 553.

The communication unit 551 can receive a request from the processing flow management server apparatus 120 and can notify the control unit 552 of the content of the received request. Further, the communication unit 551 can receive a processing result of the request from the control unit 552 and can generate response data corresponding to the request. The communication unit 551 can transmit a response including the generated response data to the processing flow management server apparatus 120.

The control unit 552 requests the document data management unit 553 to perform predetermined processing according to the request content notified from the communication unit 551. The processing performed by the document data management unit 553 in this case includes storing, deleting, and moving the transmitted document data and acquiring a list of currently managed document data.

The document data management unit 553 performs the processing for storing, deleting, and moving the transmitted document data and acquiring a list of the currently managed document data, in response to a processing request transmitted from the control unit 552, and transmits the processing result to the control unit 552.

Next, an example of the data list to be managed by each management unit of the processing flow management server apparatus 120, the PC 130, and the extended application distribution server apparatus 140 is described in detail below. In the present exemplary embodiment, each list is expressed using a schematic table format. However, a text file (of CSV format or XML) can be used.

FIG. 6A illustrates an example of the processing flow management list that can be managed by the processing flow management unit 423. The management list is an example of list information.

The processing flow management list 600 includes a first column 601, a second column 602, a third column 603, and a fourth column 604. In the management list illustrated in FIG. 6A, one record expresses information of each processing flow. The processing flow information is associated with processing flow ID information that can uniquely identify each processing flow.

The first column 601 is an information field in which the processing flow ID is described. The processing flow ID is an identifier (i.e., identification information) that can uniquely identify each processing flow. For example, the processing flow ID of a first record is "75301938."

The second column 602 is an information field in which processing flow name is described. For example, the processing flow name of the first record is "business form data transmission."

The third column 603 is an information field in which a publication destination of the processing flow is described. For example, the publication destination of the first record is "tsato." The publication destination information indicates that the above-mentioned processing flow is a processing flow to be displayed when a user having the user name "tsato" logs on the processing flow application 420.

The column 604 is an information field in which a processing flow definition file is described. The processing flow definition file is described in detail below with reference to FIG. 10.

FIG. 6B illustrates an example of the status management list that can be managed by the status management unit 454.

The status management list 620 includes a first column 621 and a second column 622. In the management list illustrated in FIG. 6B, one record expresses the status of each processing flow. If the execution of the processing flow starts in response to a request from the office application 470, the status management unit 454 adds a new record to the status management list 620.

The first column 621 is an information field in which processing flow ID information is described. The processing flow ID is an identifier that can uniquely identify each processing flow. For example, the processing flow ID of the first record is "75301938."

The second column 622 is an information field in which processing flow status information is described. For example, the processing flow status of the first record is "in progress."

FIG. 6C illustrates an example of the extended application management list that can be managed by the extended application management unit 473.

The extended application management list 650 includes a first column 651, a second column 652, a third column 653, a fourth column 654, and a fifth column 655. In the management list illustrated in FIG. 6C, one record expresses information of each extended application. The extended application stored in the extended application management list 650 is the extended application that can be launched by the office application 470.

The first column 651 is an information field in which extended application ID information is described. The extended application ID is an identifier that can uniquely identify each extended application. For example, the extended application ID of the first record is "ABCD1234."

The second column 652 is an information field in which extended application name is described. For example, the extended application name of the first record is "processing flow" of an extended application.

The third column 653 is an information field in which URL information of a web application that actually provides the extended application is described. When the extended application is currently launched, URL information about the present web application is displayed in the third column 653. For example, the URL information of the first record is "http://www.flowservice.com/main.aspx." The information stored in the third column 653 indicates the URL information of the processing flow extended application 450 of the processing flow management server apparatus 120.

The fourth column 654 is an information field in which provider information is described. The provider information is information about a person who or an organization that provides the extended application. For example, the provider of the first record is an organization "A Inc." that provides the extended application.

The fifth column 655 is an information field in which startup information indicating whether the extended application is a startup target is described. The technical term "startup" means that the extended application is launched when the office application 470 opens the document data. For example, the startup information of the first record is "true", which indicates that the extended application is the startup target. Therefore, the office application 470 automatically launches the extended application of the first record when the document data is opened. If the startup information of the first record is "false", the office application 470 does not launch the extended application of the first record when the document data is opened.

FIG. 6D illustrates an example of the extended application management list that can be managed by the extended application management unit 503 of the extended application distribution server apparatus 140.

The extended application management list 670 includes a first column 671, a second column 672, a third column 673, a fourth column 674, and a fifth column 675. The extended application stored in the extended application management list 670 is the extended application managed by the extended application distribution service 500. The extended application distribution service 500 can distribute the extended application to the office application 470.

Information described in the first column 671 to the fifth column 675 is similar to that described in the first column 651 to the fifth column 655 of the extended application management list 650. Therefore, redundant description thereof will be avoided.

(Office Application 470)

The office application 470 is described in detail below with reference to FIG. 7. The office application 470 has the document data editing function. Further, the office application 470 is configured to extend the document editing function by adding an extended application installed as a web application.

Figure 7:
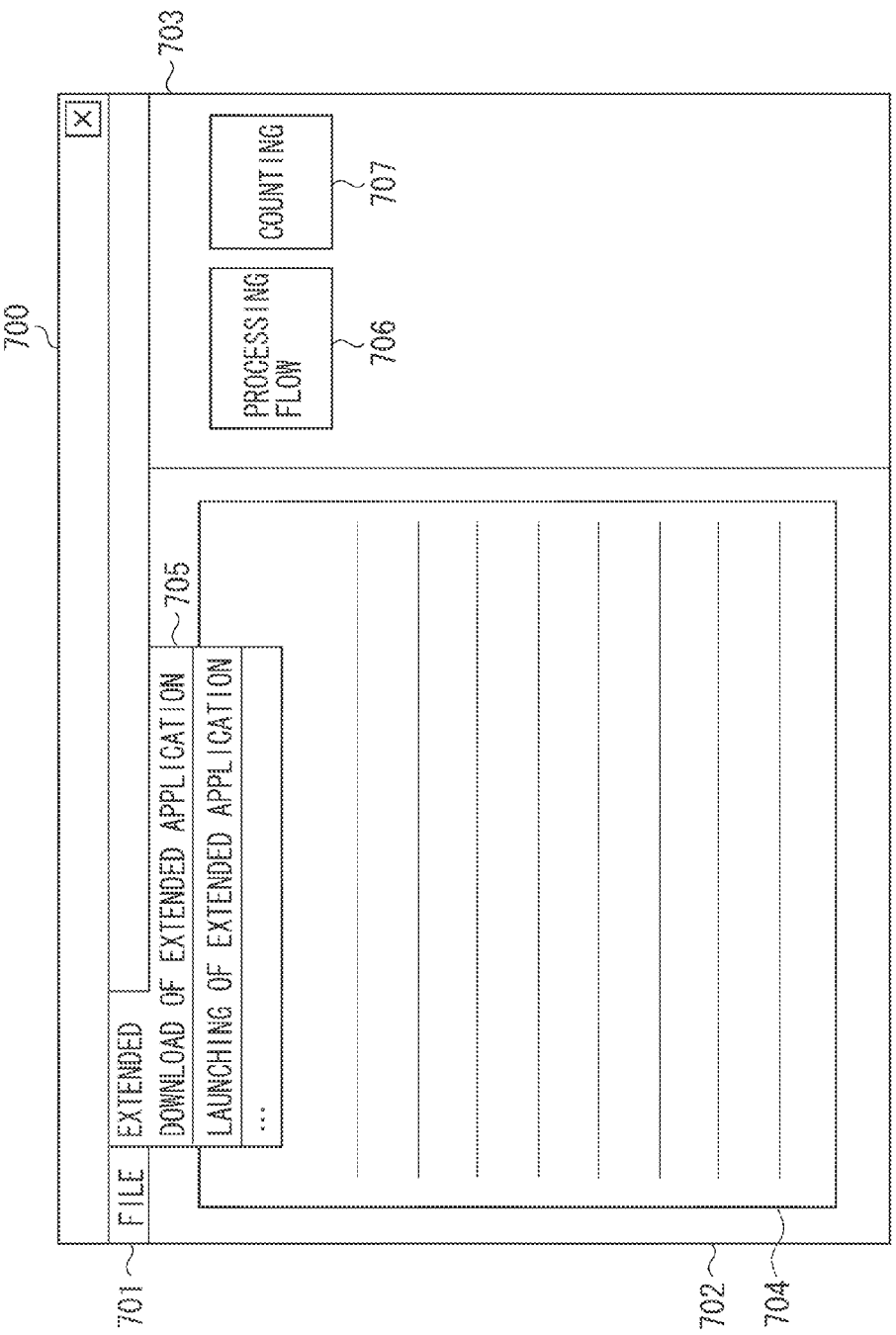
FIG. 7 illustrates an example (Part I) of a user interface (UI) that can be displayed by the PC.

FIG. 7 illustrates an example of the UI that can be displayed by the office application 470.

In FIG. 7, a UI 700 includes a menu bar 701, a document data display area 702, and a task pane 703.

The menu bar 701 is a UI that enables a user to select a function to be provided by the office application 470.

The document data display area 702 is an area in which document data can be displayed. The document data display area 702 enables a user to display document data and perform editing processing on the displayed document data. For example, when the UI 700 displays a document data 704, the document data display area 702 provides a function of editing the document data 704.

The task pane 703 is an area in which an extended application related display can be realized. The extended application can be executed as the task pane of the UI 700. The task pane 703 can display screen data if the data is provided by the web application (i.e., the substance of the extended application). Further, the task pane 703 can display screen data, if the screen data is provided by the extended application distribution service 500.

A menu 705 is a menu usable to call a download function of the extended application. Hereinafter, the download function of the extended application is simply described. The download of the extended application is downloading metadata of the extended application, not the download of the substance of the extended application. The metadata of the extended application is data stored as a record in the extended application management list 670 of the extended application distribution service 500. URL information of the web application (i.e., the substance of the extended application) is stored in the column 673 of the extended application management list 670. Therefore, the office application 470 can use the extended application.

If a user presses the menu 705 via the pointing device 308, the office application 470 requests the extended application distribution service 500 to send a list of extended applications that can be distributed. The list of distributable extended applications is, for example, a list in which information about the extended application ID and the name is described.

When the extended application distribution service 500 receives the request, the control unit 502 requests the extended application management unit 503 to send an extended application list.

The extended application management unit 503 acquires the requested list from the extended application management list 670 and sends the acquired list to the control unit 502.

The control unit 502 transmits a response including the acquired extended application list to the office application 470 via the communication unit 501.

The office application 470 displays the received extended application list on the task pane. For example, the task pane 703 displays a button 706 and a button 707 that are operable to download each extended application. If a user presses the button 706 or the button 707 via the pointing device 308, the office application 470 transmits an extended application ID tied to the pressed button to the extended application distribution service 500. Accordingly, the office application 470 requests the extended application distribution service 500 to perform the downloading of the extended application.

In response to the request from the office application 470, the extended application distribution service 500 performs a function of downloading the extended application.

More specifically, the control unit 502 sends the extended application ID included in the request received via the communication unit 501 to the extended application management unit 503.

The extended application management unit 503 compares the information described in the column 671 of the extended application management list 670 with the received extended application ID. Then, the extended application management unit 503 sends the data of the coincided record to the control unit 502.

The control unit 502 transmits a response including the record data (e.g., metadata of the extended application) to the office application 470 via the communication unit 501. As mentioned above, the control unit 502 can realize the function of downloading of the extended application.

If the office application 470 receives the response, the extended application management unit 473 adds the metadata of the extended application included in the response to the extended application management list 650. Accordingly, the office application 470 can execute the extended application.

(Generation of Processing Flow)
Next, processing flow generation processing is described in detail below with reference to FIGS. 8 to 10.

First, a user inputs URL information of the processing flow application 420 to the web browser operating on the PC 130 via the input apparatus 304. Then, the user presses a connection button to instruct a request.

In response to the request instruction, the web browser requests the processing flow application 420 to send screen data.

If the processing flow application 420 receives the request from the web browser, the UI generation unit 424 generates image data for a log-in screen. The processing flow application 420 transmits a response including the generated log-in screen data to the web browser.

The user inputs a user name and a password on the log-in screen displayed on the web browser, via the input apparatus 304, and presses a button via the pointing device 308 to transmit a log-in instruction to the web browser.

If the web browser receives the log-in instruction, the web browser transmits the user name and the password to the processing flow application 420.

The authentication unit 425 of the processing flow application 420 performs authentication processing based on the user name and the password received from the web browser.

If the authentication processing has been successfully completed, the UI generation unit 424 of the processing flow application 420 generates the processing flow generation screen and transmits the generate screen to the web browser via the communication unit 421.

The web browser displays a processing flow generation screen 800, which is described below with reference to FIG. 8, on the display apparatus 307.

Figure 8:
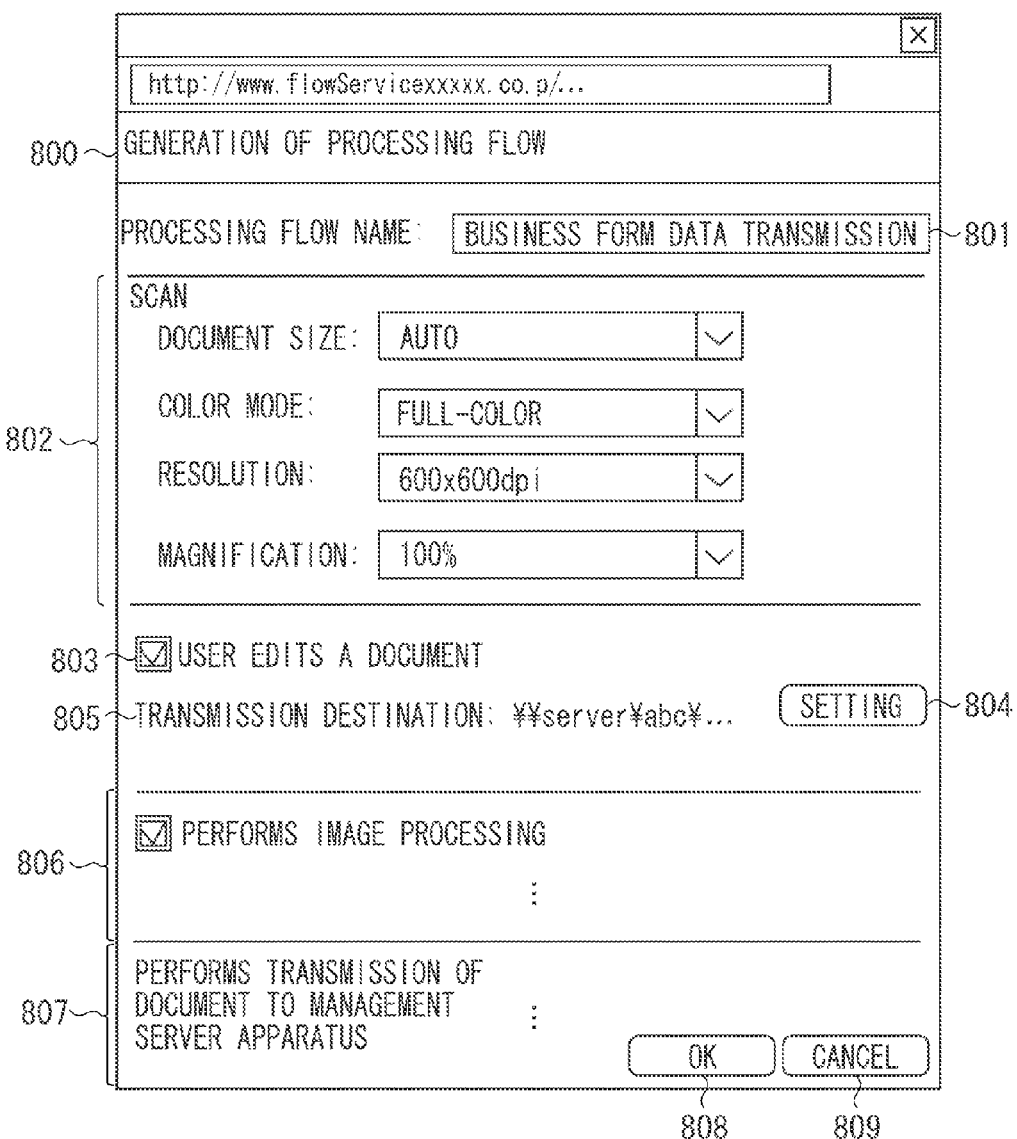
FIG. 8 illustrates an example (Part II) of the UI that can be displayed by the PC.

FIG. 8 illustrates an example of UI that can be displayed by the web browser operating on the PC 130 based on the screen data generated by the UI generation unit 424 of the processing flow application 420. The web browser displays the processing flow generation screen 800 on the display apparatus 307.

An area 801 is an entry field in which a character string can be input to perform processing flow name setting.

An area 802 is an entry field in which setting information can be input to perform scanning. According to the example illustrated in FIG. 8, setting information relating to "document size", "color mode", "resolution", and "magnification" can be input in the entry field 802 of the processing flow generation screen 800.

A check box 803 is a check box which enables a user to edit a document before completing the processing flow.

A button 804 can be validated when a check mark is input in the check box 803 of the processing flow generation screen 800.

The button 804 is operable to set a transmission destination. The web browser operating on the PC 130 can receive a pressing signal when a user presses the button 804 via the pointing device 308. Then, the web browser operating on the PC 130 displays a transmission destination selection screen 1700, which is described in detail below with reference to FIG. 9. The transmission destination selection screen 1700 is usable to select a desired transmission destination from the address list managed by the processing flow application 420.

More specifically, if the button 804 is pressed, the web browser operating on the PC 130 requests the processing flow application 420 to send screen data of the transmission destination selection screen 1700. When the processing flow application 420 receives the request, the processing flow application 420 generates the screen data of the transmission destination selection screen 1700 and transmits a response including the generated screen data to the web browser operating on the PC 130. Then, the web browser operating on the PC 130 receives the screen data and displays the transmission destination selection screen 1700.

Hereinafter, the transmission destination selection screen 1700 is described in detail below with reference to FIG. 9.

Figure 9:
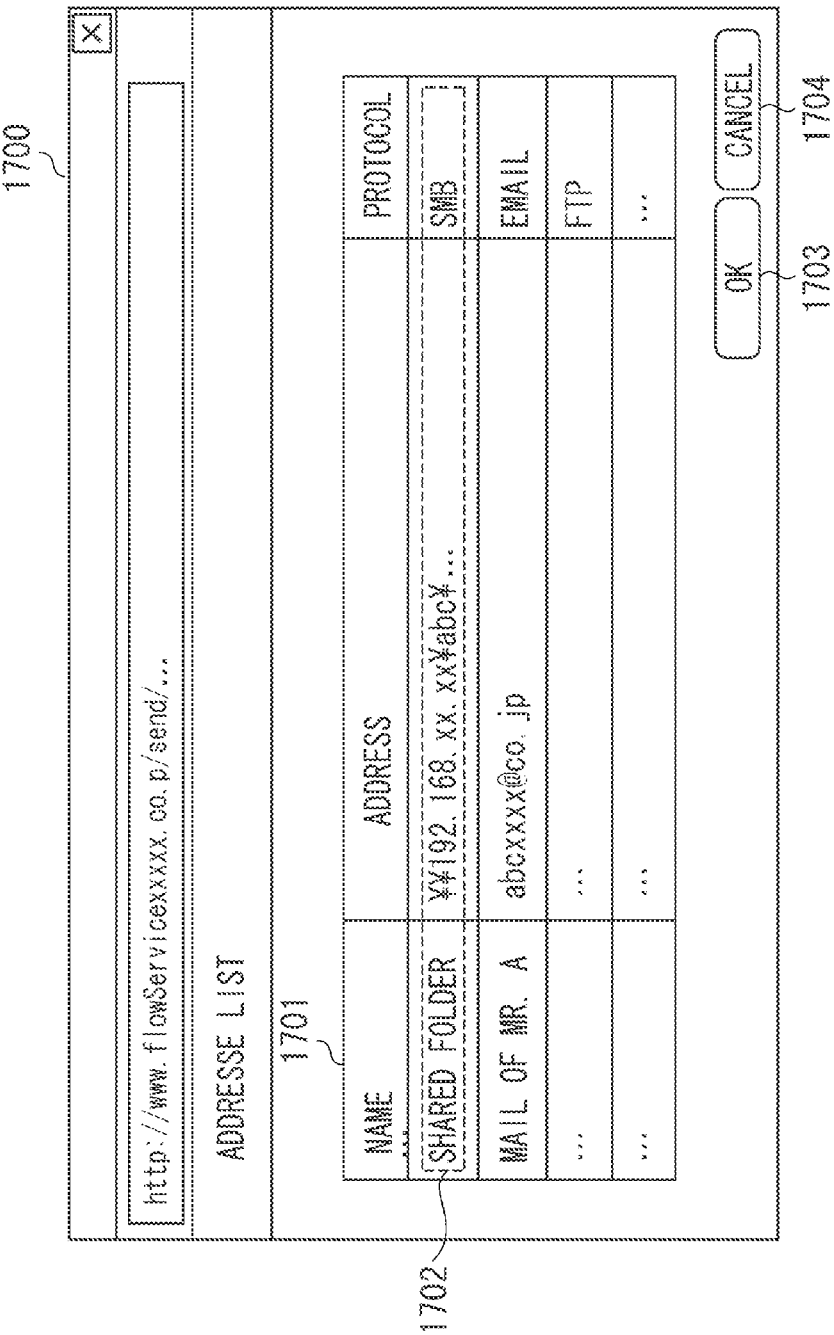
FIG. 9 illustrates an example (Part III) of the UI that can be displayed by the PC.

FIG. 9 illustrates an example of the UI that can be displayed by the web browser operating on the PC 130 based on the screen data to display the transmission destination selection screen 1700.

An address list 1701 is a list that is provided to display a list of addresses that are managed by the processing flow application 420. The address list 1701 includes three columns of "name", "address", and "protocol." Each record includes only one address.

For example, a record 1702 includes one address. More specifically, the information included in the record 1702 is "shared folder" in the name field, "\\192.168.xx.xx\abc\..." in the address field, and "SMB" in the protocol field. The record 1702 is currently in a selected state because the record 1702 is enclosed with a dotted line.

A button 1703 is an OK button that is operable to set the address of the record selected in the address list 1701 as a transmission destination. If a user presses the button 1703 via the pointing device 308, the web browser operating on the PC 130 closes the transmission destination selection screen 1700.

A button 1704 is a cancel button that is operable to terminate the transmission destination setting processing without setting the address of the record selected in the address list 1701 as the transmission destination. If a user presses the button 1704 via the pointing device 308, the web browser operating on the PC 130 closes the transmission destination selection screen 1700.

Referring back to FIG. 8, if the web browser operating on the PC 130 receives the transmission destination selected by a user from the transmission destination selection screen 1700 via the pointing device 308 and if the user presses the button 1703, the web browser operating on the PC 130 displays the transmission destination as a label 805.

The label 805 is information indicating the transmission destination. If the MFP 110 completes the processing of a processing flow, the MFP 110 transmits the document data to the transmission destination that is currently set as the label 805. Each user can perform document data editing processing before completing the processing flow by editing the document data stored in the transmission destination via the input apparatus 304. The above-mentioned UI in the present exemplary embodiment is configured to set a transmission destination when it is selected from a list of transmission destinations. However, it is useful that the UI includes a dedicated entry field into which a character string can be input, so that a user can directly input a transmission destination name via the input apparatus 304.

An area 806 is an entry field in which image processing to be executed by the task execution unit 426 of the processing flow application 420 can be set. Each user can perform settings for the image processing by inputting information in the entry field 806 via the input apparatus 304.

An area 807 is an entry field in which transmission to the document management server apparatus 150 to be performed by the task execution unit 426 of the processing flow application 420 can be set. Each user can perform settings relating to URL information and authentication information of the document management server apparatus 150 via the input apparatus 304.

A button 808 is a button that is operable to instruct a generation of processing flow information. If a user presses the button 808 via the pointing device 308, the web browser transmits the input information of the processing flow generation screen 800 to the processing flow application 420. The processing flow control unit 422 of the processing flow application 420 analyzes the received information and generates the processing flow definition file, which will be described in detail below with reference to FIG. 10. Then, in response to an instruction from the processing flow control unit 422, the processing flow management unit 423 registers the generated processing flow definition file in the processing flow management list 600.

A button 809 is a button that is operable to cancel the generation of the processing flow information. If a user presses the button 809 via the pointing device 308, the web browser stops generating the processing flow information on the processing flow generation screen 800.

FIG. 10 illustrates a processing flow information definition file 900 (i.e., an example of the processing flow information definition file) to be stored in the column 604 of the processing flow management list 600.

The processing flow information definition file 900 has a format that can be processed by the processing flow application 420 and the processing flow execution application 400.

A tag 901 is a "JobScript" tag, which indicates each processing flow. Definition relating to each processing flow is described in the tag 901.

An attribute 902 is a "name" attribute, which indicates a processing flow name. More specifically, the processing flow name is "business form data transmission." The information to be described as the attribute 902 is the content having been input in the entry field 801.

An attribute 903 is a "user" attribute, which indicates the publication destination of the processing flow. More specifically, the publication destination of the processing flow is "tsato."

An attribute 904 is an "id" attribute, which indicates ID information of the processing flow. More specifically, the ID information of the processing flow is "75301938." More specifically, the present processing flow definition file is "23153.xml" of the first record stored in the processing flow management list 600.

A tag 905 is a "Scan" tag, which indicates that the present task is a task relating to the scan. The information to be described in the tag 905 is a definition of the scan related task. More specifically, the information to be described in the tag 905 is the content having been input in the area 802.

A tag 906 is a "Send" tag, which indicates that the present task is a task relating to the transmission of the MFP 110. More specifically, the information to be described in the tag 906 is a definition of the transmission related task. In the present exemplary embodiment, the processing flow control unit 422 of the processing flow application 420 outputs the tag 906 if a check mark is input in the check box 803 (namely, if it is determined that a setting to enable "a user to edit a document" is performed). Therefore, if the tag 906 is present, it is understood that the user will perform an editing work before completing the processing flow.

A tag 907 is a "SMBPath" tag, in which a transmission destination of Server Message Block (SMB) is described. The information to be described in the tag 907 is the content displayed as the label 805.

A tag 908 is an "InText" tag, which indicates information to be embedded into the document data by the MFP 110. According to the processing flow illustrated in FIG. 10, the information of the "InText" tag is "75301938", which indicates that the MFP 110 embeds ID information of the present processing flow into the document data. A tag 909 is an "Imaging" tag, which indicates a task definition relating to image processing to be performed by the task execution unit 426 of the processing flow application 420. The information to be described in the tag 909 is the content having been input in the area 806.

A tag 910 is a "Connector" tag, which indicates a task definition relating to the transmission to the document management server apparatus 150 to be performed by the task execution unit 426 of the processing flow application 420. The information to be described in the tag 910 is the content having been input in the area 807. The processing flow control unit 422 of the processing flow application 420 generates the processing flow as described above.

(Execution of Processing Flow to be Performed by MFP 110)

Next, processing flow execution processing that can be performed by the MFP 110 is described in detail below with reference to FIGS. 11A, 11B, 12, and 13.

Figure 11A:
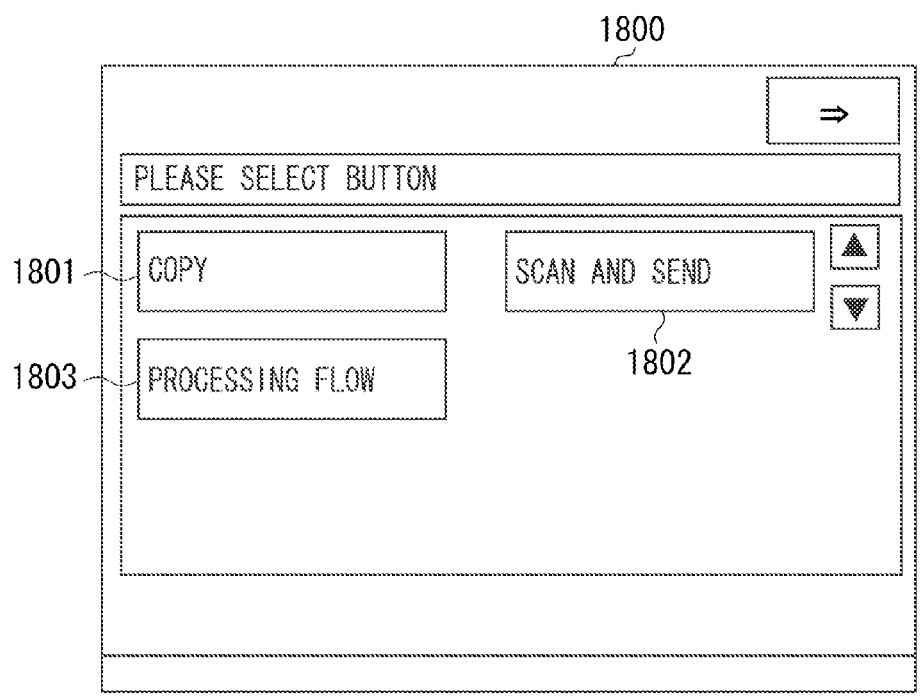
FIGS. 11A and 11B illustrate an example of the UI that can be displayed by the MFP.

FIG. 11A illustrates a UI 1800 (i.e., an example of the UI) that can be displayed by the operation unit 111 of the MFP 110. First, a user operates the UI 1800 via the operation unit 111 of the MFP 110.

A button 1803 is a button that is operable to display a UI of the processing flow execution application 400. If the user presses the button 1803 via the operation unit 111, the MFP 110 launches the processing flow execution application 400.

Then, the UI unit 404 of the processing flow execution application 400 displays a screen that can receive an input of authentication information. If the user inputs the authentication information via the operation unit 111, the UI unit 404 receives an instruction to access the processing flow application 420 in response to a button pressing operation.

The processing flow execution application 400 of the MFP 110 requests the processing flow management server apparatus 120 to log in the processing flow application 420. In this case, the processing flow execution application 400 transmits the authentication information having been input via the above-mentioned authentication information entry screen to the processing flow application 420.

The processing flow application 420 receives the log-in request via the communication unit 421. The authentication unit 425 of the processing flow application 420 performs authentication processing by collating the authentication information included in the received log-in request with the authentication information managed by the authentication unit 425.

If it is determined that the authentication processing has failed, the authentication unit 425 transmits an authentication error notification to the MFP 110 via the communication unit 421. If the authentication unit 425 successfully completes the authentication processing, the processing flow control unit 422 requests the processing flow management unit 423 to acquire a list of processing flow information tied to the user name that is included in the authentication information.

The processing flow management unit 423 identifies the processing flow information tied to the user name by comparing the received user name with the column 603 of the processing flow management list 600.

The processing flow control unit 422 transmits the processing flow information list received from the processing flow management unit 423 to the MFP 110 via the communication unit 421.

The processing flow execution application 400 of the MFP 110 receives the processing flow information list via the communication unit 401. The processing flow information list includes the processing flow name and the processing flow ID, although the processing flow information list may not include the processing flow definition file stored in the column 604.

Figure 11B:
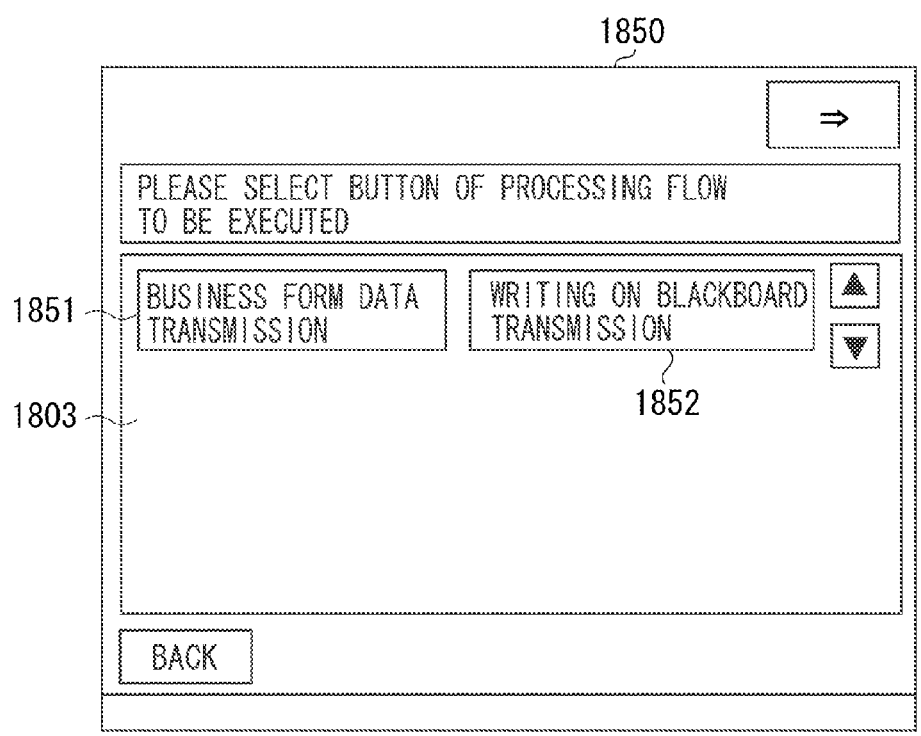

The UI unit 404 of the processing flow execution application 400 displays a UI 1850 illustrated in FIG. 11B.

Hereinafter, the UI 1850 is described in detail below with reference to FIG. 11B.

The UI example illustrated in FIG. 11B display a list of buttons that are operable to execute the processing flow relating to the received processing flow information received by the processing flow execution application 400 of the MFP 110.

A button 1851 is a button that is operable to execute a processing flow if the processing flow name thereof is "business form data transmission."

A button 1852 is a button that is operable to execute a processing flow if the processing flow name thereof is "writing on blackboard transmission."

A button 1853 is a button that is operable to open the UI 1800.

If a user presses the button 1851 or the button 1852 to execute the processing flow via the operation unit 111, the UI unit 404 receives a pressing signal as an instruction to execute the processing flow.

Figure 12:
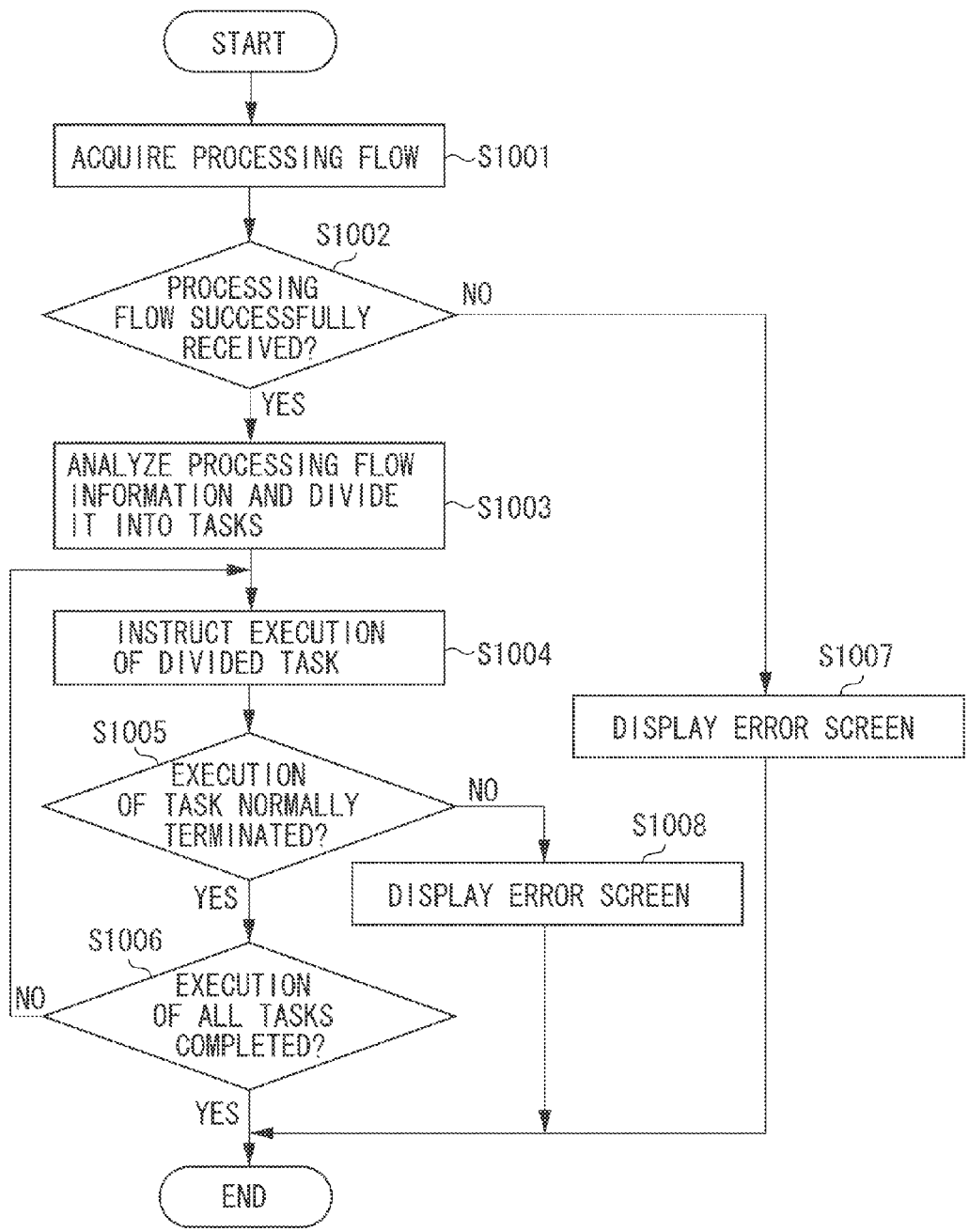
FIG. 12 is a flowchart illustrating an example of processing that can be performed by the MFP.

FIG. 12 is referred to in the following description.

FIG. 12 is a flowchart illustrating an example of processing that can be performed by the MFP 110, which includes acquiring a processing flow and executing the acquired processing flow.

In step S1001, the processing flow control unit 402 requests the processing flow application 420 to acquire a processing flow via the communication unit 401. The processing flow control unit 402 sends a request including the processing flow ID having been button pressed to the processing flow application 420. Then, if the communication unit 401 receives a response including processing flow information from the processing flow application 420, the operation proceeds to step S1002.

The processing to be performed by the processing flow application 420 in response to the request is simply described below.

The communication unit 421 of the processing flow application 420 receives the processing flow request. The processing flow control unit 422 identifies processing flow information tied to the processing flow ID included in the received processing flow request. More specifically, the processing flow management unit 423 identifies the processing flow information by comparing the column 601 of the processing flow management list 600 with the received processing flow ID. If the processing flow management unit 423 cannot identify the processing flow information, the communication unit 421 transmits error information to the processing flow execution application 400. If the processing flow management unit 423 can identify the processing flow information, the communication unit 421 transmits the identified processing flow information to the processing flow execution application 400.

In this case, instead of transmitting all of the processing flow information identified by the processing flow management unit 423, the communication unit 421 can transmit only a portion to be executed by the MFP 110. For example, if the processing flow information to be processed is the processing flow information definition file 900, the processing flow control unit 422 can modify the information into simple processing flow information including only a scan task and an SMB transmission task before transmitting the processing flow information. The above-mentioned modification is useful in that the MFP 110 can receive only the definition of the processing flow to be executed by the MFP 110. For example, it becomes feasible to prevent the information described in the tag 910 (e.g., authentication information of the document management server apparatus 150) from unnecessarily leaking to the network 100.

In step S1002, the processing flow control unit 402 determines whether the processing flow information has been acquired. If the processing flow control unit 402 determines that the processing flow information has been acquired (YES in step S1002), the operation proceeds to step S1003. On the other hand, if the processing flow control unit 402 determines that the response is an error and the processing flow information has not been acquired (NO in step S1002), the operation proceeds to step S1007.

In step S1003, the processing flow control unit 402 analyzes the processing flow information and divides it into a plurality of tasks. Then, the operation proceeds to step S1004.

In step S1004, the processing flow control unit 402 instructs the task execution unit 403 to execute each divided task. The task execution unit 403 executes each task. Then, the operation proceeds to step S1005.

In step S1005, the processing flow control unit 402 determines whether the task executed by the task execution unit 403 has been normally terminated. If the processing flow control unit 402 determines that the termination is normal (YES in step S1005), the operation proceeds to step S1006. If the processing flow control unit 402 determines that the termination is not normal (NO in step S1005), the operation proceeds to step S1008.

In step S1006, the processing flow control unit 402 determines whether all tasks to be executed by the MFP 110 has been completed. If the processing flow control unit 402 determines that all tasks has been executed (YES in step S1006), the processing flow control unit 402 terminates the processing of the flowchart illustrated in FIG. 12. If the processing flow control unit 402 determines that all tasks has not yet been executed (NO in step S1006), the operation proceeds to step S1004. For example, in a case where the processing flow information definition file 900 having been described with reference to FIG. 10 is processed according to the flowchart illustrated in FIG. 12, the task execution unit 403 performs the processing in step S1004 two times to execute the scan task and the SMB transmission task. Further, when the task execution unit 403 performs the SMB transmission task, the task execution unit 403 embeds processing flow information ID into the document data as defined in the tag 908. The generated document data is described in detail below with reference to FIG. 13.

In step S1007, the UI unit 404 displays an error screen notifying that the acquisition of the processing flow information has failed and terminates the processing of the flowchart illustrated in FIG. 12.

In step S1008, the UI unit 404 displays an error screen notifying that the execution of the processing flow has failed and terminates the processing of the flowchart illustrated in FIG. 12.

FIG. 13 illustrates an example of the document data generated when the MFP 110 executes the processing flow defined by the processing flow information definition file 900.

The document data 1100 is expressed using the XML format. However, the data to be used in the present exemplary embodiment is not limited to XML data. For example, it is useful to use binary data.

A tag 1101 is a "document" tag, in which a definition relating to the document data is described.

A definition relating to the document data to be displayed in the document data display area 702 is described in an area 1102. For example, according to the definition in the area 1102, a character string "journal" is displayed in the document data display area 702.

A tag 1103 is a "jobScriptId" tag, which is added as a tag extended by the processing flow execution application 400. Therefore, the tag 1103 is not displayed in the document data display area 702. The processing flow execution application 400 adds the value of the tag 908 of the processing flow information definition file 900 as the value of the tag 1103. More specifically, the processing flow execution application 400 adds the processing flow ID as the value of the tag 1103. In the present exemplary embodiment, the tag 1103 is added as an extended tag in the document data. However, the any other method is employable. For example, the document data expressed using the XML format may be separately configured as a text file and an image file (i.e., not a single file). In this case, a compressed file including a plurality of types of files can be obtained.

If the document data to be processed is the above-mentioned document data, the processing flow execution application 400 can generate an independent file that is different from that for the document data (not an extended tag in the document data) and can describe the processing flow information ID in the generated independent file.

(Execution of Processing Flow to be Performed by PC 130)

Next, processing that can be performed by the PC 130 is described in detail below with reference to FIGS. 14 to 19. The processing that can be performed by the PC 130 includes editing and confirming the document data received from the MFP 110 and executing the processing flow.

Figure 14:
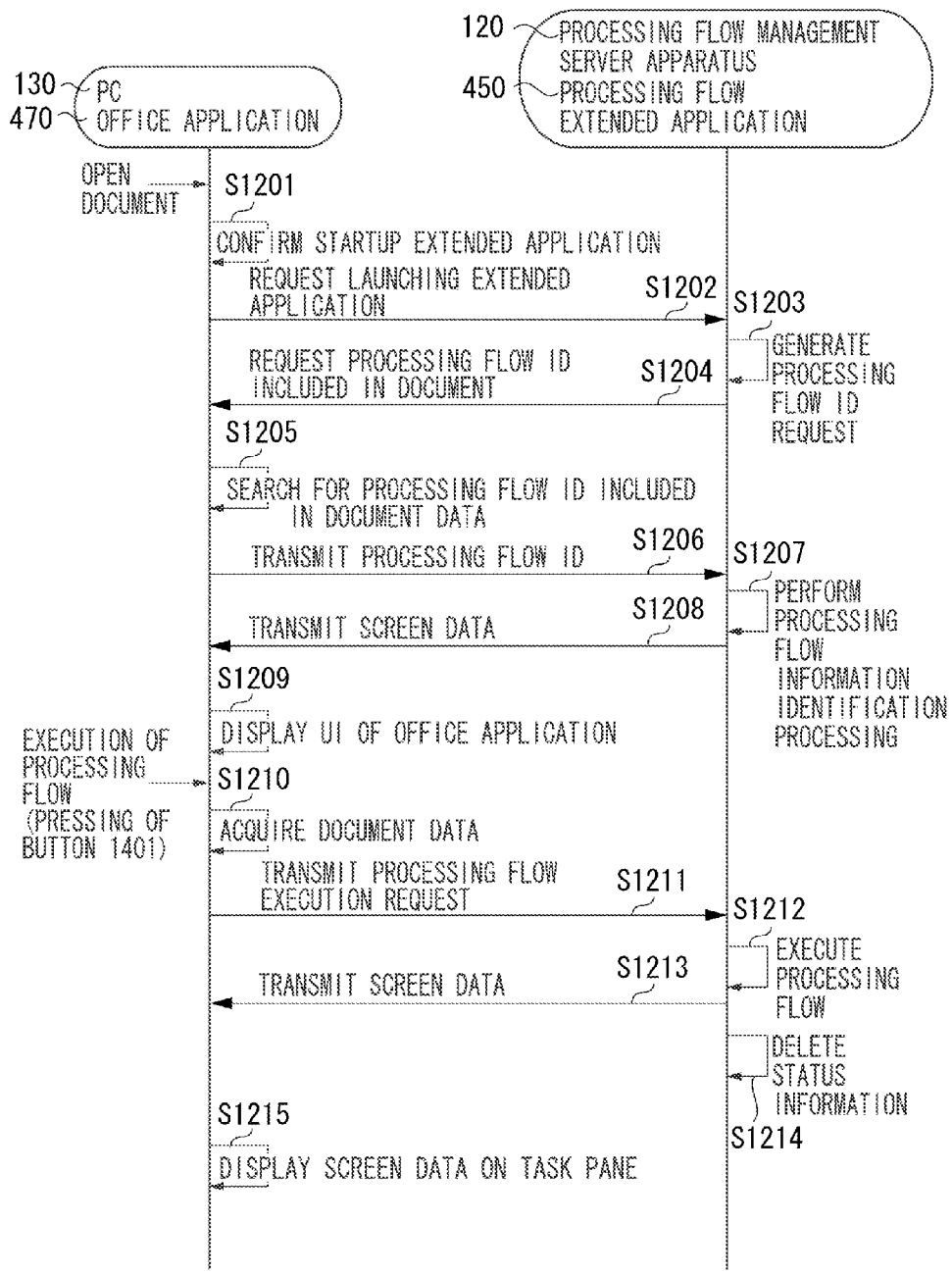
FIG. 14 illustrates an example of sequence processing that can be performed by the PC and the processing flow management server apparatus.

FIG. 14 illustrates an example of sequence processing that can be performed by the office application 470 and the processing flow extended application 450.

First, the PC 130 receives a user operation to open the document data via the input apparatus 304 and launches the office application 470.

In step S1201, the extended application management unit 473 of the office application 470 of the PC 130 identifies a startup extended application. More specifically, the extended application management unit 473 searches for an extended application that has a value "true" in the column 655 of the extended application management list 650. In the extended application management list 650, the value "true" is stored in the column 655 of the processing flow extended application 450 of the first record. Therefore, the extended application management unit 473 can identify the processing flow extended application 450 as the startup extended application.

In step S1202, the office application 470 of the PC 130 requests the extended application having been identified as startup, to perform launching processing. More specifically, the office application 470 sends a launching request to the processing flow extended application 450. The office application 470 can identify URL information of the processing flow extended application 450 with reference to the extended application management list 650. The processing flow extended application 450 receives the launching request from the office application 470.

In step S1203, the processing flow extended application 450 of the processing flow management server apparatus 120 generates a request for the processing flow ID included in the document data. More specifically, the control unit 452 requests the UI generation unit 453 to generate the request for the processing flow ID. The UI generation unit 453 generates a command (e.g., JavaScript) that can be analyzed by the document data cooperation unit 472 of the office application 470.

In step S1204, the processing flow extended application 450 of the processing flow management server apparatus 120 transmits the processing flow ID request command generated in step S1203 to the office application 470. Then, the office application 470 receives the processing flow ID request command.

In step S1205, the office application 470 of the PC 130 searches for the processing flow ID included in the document data. More specifically, the document data cooperation unit 472 analyzes the received processing flow ID request command. Then, the document data cooperation unit 472 instructs the document data editing unit 471 to search for the processing flow ID. The document data editing unit 471 checks the presence of the processing flow ID in the document data. More specifically, the document data editing unit 471 determines whether the "jobScriptId" tag is included in the document data. If it is determined that the "jobScriptId" tag is not present, the office application 470 displays the document data without displaying the screen data of the processing flow extended application 450 on the task pane 703.

Further, when the "jobScriptId" tag is not included in the document data, the office application 470 does not perform processing in steps S1206 to S1214. Accordingly, if it is determined that there is not any processing flow ID embedded in the document data, the office application 470 can display the document data without launching the processing flow extended application 450. As mentioned above, it is useful that the office application 470 launches the processing flow extended application 450 only when the processing flow ID is embedded in the document data, and then display a screen on the task pane 703.

Alternatively, the system can be configured to encourage a user to input a processing flow ID if it is determined that there is not any processing flow ID embedded in the document data. On the other hand, if it is determined that the "jobScriptId" tag is present, the document data editing unit 471 acquires the processing flow ID described in the "jobScriptId" tag. The operation proceeds to step S1206. For example, the processing flow ID is "75301938" if the processing flow information to be processed is the processing flow information definition file 900.

In step S1206, the office application 470 of the PC 130 transmits the processing flow ID searched in step S1205 to the processing flow extended application 450. The processing to be performed in step S1206 is an example of identification information transmission processing.

In step S1207, the processing flow extended application 450 of the processing flow management server apparatus 120 performs processing flow information identification processing. The processing to be performed in step S1207 is described in detail with reference to FIG. 15.

Figure 15:
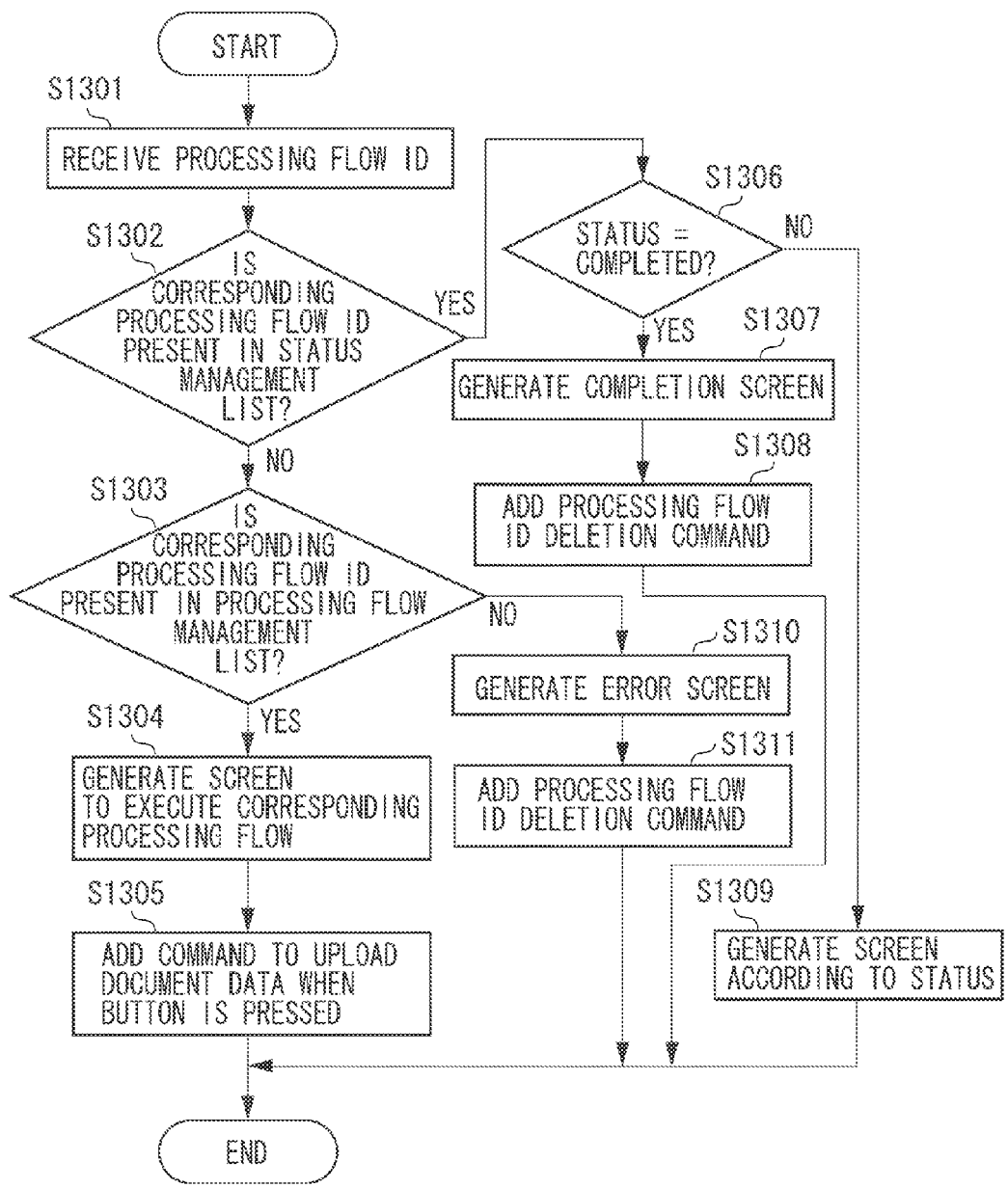
FIG. 15 is a flowchart illustrating an example (Part I) of processing that can be performed by the processing flow management server apparatus.

FIG. 15 is a flowchart illustrating an example of the processing to be performed by the processing flow extended application 450 in step S1207.

In step S1301, the communication unit 451 receives the processing flow ID transmitted from the office application 470. Then, the operation proceeds to step S1302.

In step S1302, the control unit 452 causes the status management unit 454 to confirm whether the received processing flow ID is present in the status management list 620. The status management unit 454 checks whether a processing flow ID that coincides with the received processing flow ID is present in the column 621 of the status management list 620. If the status management unit 454 confirms the presence of the processing flow ID that coincides with the received processing flow ID (YES in step S1302), the operation proceeds to step S1306. If the status management unit 454 determines that there is not any coincident processing flow ID (NO in step S1302), the operation proceeds to step S1303.

In step S1303, the control unit 452 inquires the processing flow application 420 whether processing flow information tied to the processing flow ID received in step S1301 is present in the processing flow management list 600. Then, the control unit 452 receives the check result from the processing flow application 420. If the control unit 452 confirms the processing flow ID included in the received result (YES in step S1303), the operation proceeds to step S1304. On the other hand, if the control unit 452 determines the presence of the processing flow ID (NO in step S1303), the operation proceeds to step S1310.

Processing to be performed by the processing flow application 420 in response to the inquiry received from the control unit 452 is simply described below. The processing flow management unit 423 confirms whether the inquired processing flow ID is present in the column 601 of the processing flow management list 600. Then, if it is determined that the processing flow ID is present, the processing flow management unit 423 sends the processing flow information (e.g., processing flow name) to the processing flow extended application 450. If it is determined that the processing flow ID is not present, the processing flow management unit 423 sends the result to the processing flow extended application 450.

In step S1304, the UI generation unit 453 generates screen data to execute the processing flow that relates to the processing flow information tied to the processing flow ID received in step S1301. Then, the operation proceeds to step S1305. An example of the UI that can be displayed by the office application 470 based on the screen data generated in step S1304 is described in detail below with reference to FIG. 16.

In step S1305, the UI generation unit 453 adds an upload command, which instructs to upload the document data to the processing flow extended application 450, to the screen data generated in step S1304. Then, the UI generation unit 453 terminates the processing of the flowchart illustrated in FIG. 15.

In step S1306, the status management unit 454 confirms the status of the processing flow. More specifically, the status management unit 454 confirms whether the status stored in the column 622 of the status management list 620 is "completed." If the status management unit 454 determines that the status of the processing flow is "completed" (YES in step S1306), the operation proceeds to step S1307. If the status management unit 454 determines that the status of the processing flow is not "completed" (NO in step S1306), the operation proceeds to step S1309.

In step S1307, the UI generation unit 453 generates a screen notifying that the processing flow has been completed. Then, the operation proceeds to step S1308. The UI that can be displayed by the office application 470 based on the screen data generated in step S1307 is described in detail below with reference to FIG. 19A.

In step S1308, the UI generation unit 453 adds a deletion command, which instructs deleting the processing flow ID embedded in the document data, to the screen data generated in step S1307. Namely, the UI generation unit 453 adds a deletion message to the screen data generated in step S1307. Then, the UI generation unit 453 terminates the processing of the flowchart illustrated in FIG. 15.

At this moment, the execution of the processing flow is already completed. Therefore, it is unnecessary for the office application 470 to execute the processing flow again when the office application 470 opens the document data next time. Therefore, the office application 470 deletes the processing flow ID embedded in the document data. Accordingly, when the office application 470 opens the document data again, the office application 470 cannot find any processing flow ID through the processing flow ID search processing to be performed in step S1205. Therefore, the screen data generated by the processing flow extended application 450 is not displayed on the task pane 703.

In step S1309, the UI generation unit 453 generates screen data according to the status and terminates the processing of the flowchart illustrated in FIG. 15. An example of the UI that can be displayed by the office application 470 based on the screen data generated in step S1309 is described in detail below with reference to FIG. 19B.

Hereinafter, processing to be performed when the PC 130 closes the document data before completing the execution of the processing flow based on a user operation received via the pointing device 308 is described in detail below.

The status management unit 454 manages the status of the processing flow using the status management list 620. More specifically, when the execution of the processing flow has been completed, the status management unit 454 holds the information indicating that the execution of the processing flow has been completed. Therefore, when the PC 130 opens the document data next time, the UI generation unit 453 generates screen data notifying that the processing flow has been completed. Then, the UI generation unit 453 adds a deletion command, which instructs deleting the processing flow ID embedded in the document data, to the generated screen data. More specifically, the UI generation unit 453 performs processing similar to the processing performed in steps S1307 and S1308.

In step S1310, the UI generation unit 453 generates screen data notifying an error result. Then, the operation proceeds to step S1311. An example of the UI that can be displayed by the office application 470 based on the screen data generated in step S1310 is described in detail below with reference to FIG. 19C.

In step S1311, the UI generation unit 453 adds a deletion command, which instructs deleting the processing flow ID embedded in the document data, to the screen data generated in step S1310. Then, the UI generation unit 453 terminates the processing of the flowchart illustrated in FIG. 15.

When the processing flow ID deletion command is added to the screen data in step S1311, it becomes feasible to prevent the error screen generated in step S1310 from being displayed when the office application 470 opens the document data again. In the processing to be performed in step S1303, the control unit 452 determines that the processing flow information that corresponds to the processing flow ID included in the document data is not present in the processing flow management list 600. Therefore, if the office application 470 does not delete the processing flow ID included in the document data, the error screen generated in step S1310 will be displayed when the office application 470 opens the same document data again. As described above, the processing flow extended application 450 of the processing flow management server apparatus 120 performs the processing flow information identification processing in step S1207.

Referring back to FIG. 14, in step S1208, the processing flow extended application 450 of the processing flow management server apparatus 120 transmits the screen data generated in step S1207 to the office application 470. The office application 470 of the PC 130 receives the screen data. If the transmitted screen data is the image generated in step S1307, the status management unit 454 of the processing flow extended application 450 deletes a corresponding record of the processing flow information from the status management list 620 after the transmission of the screen data is normally completed.

In step S1209, the office application 470 of the PC 130 displays the screen data received from the processing flow extended application 450 on the task pane 703. Further, the office application 470 of the PC 130 displays the document data in the document data display area 702. Therefore, the UI of the office application 470 can be displayed. An example of the screen to be displayed in step S1209 is described in detail below with reference to FIGS. 16 to 19.

Figure 16:
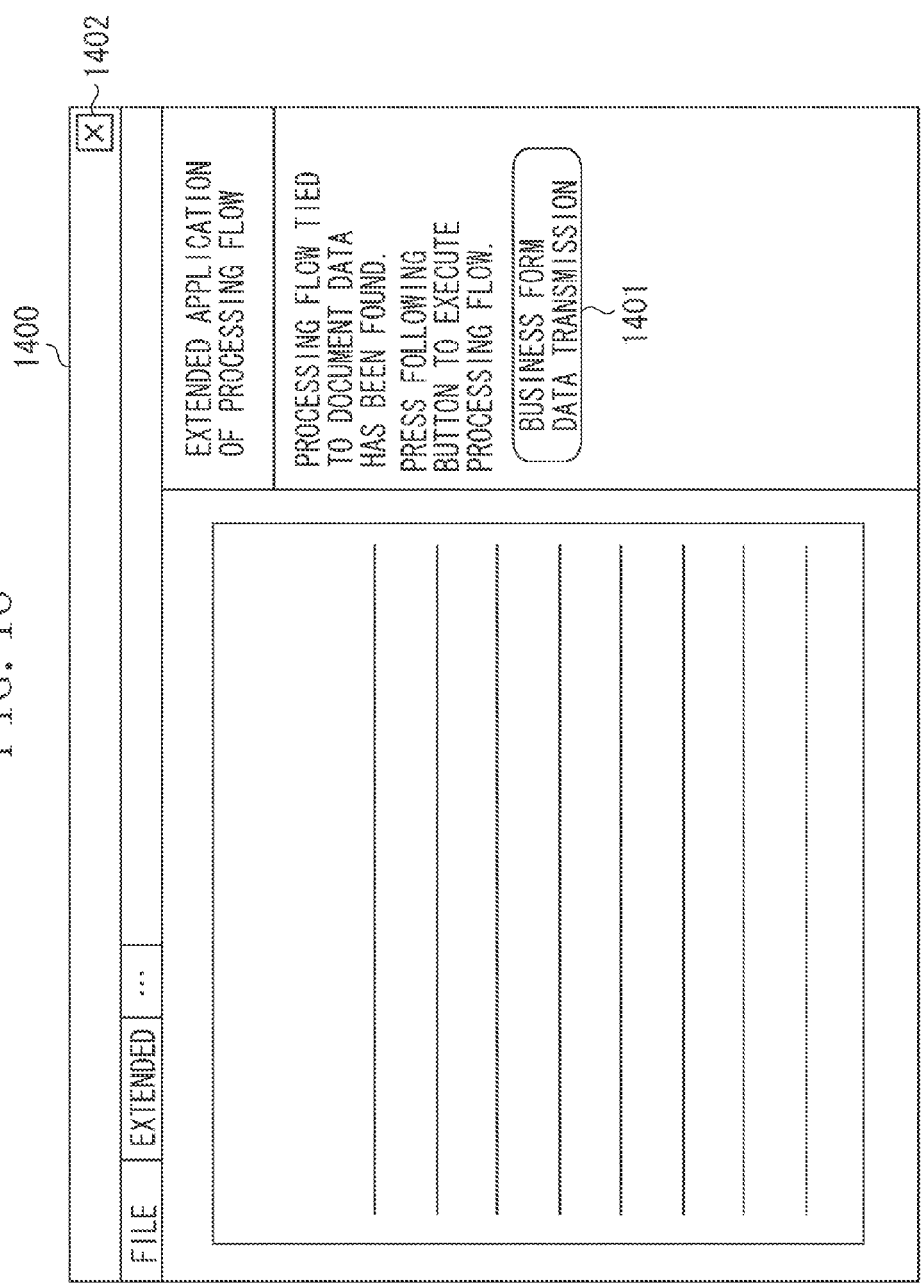
FIG. 16 illustrates an example (Part IV) of the UI that can be displayed by the PC.

FIG. 16 illustrates a UI 1400 that can be displayed by the office application 470 in step S1209.

The UI 1400 can be displayed on the task pane 703 based on the screen data generated by the UI generation unit 453 of the processing flow extended application 450 in step S1304.

A button 1401 is a button that is operable to execute the processing flow. If a user presses the button 1401 via the pointing device 308, the operation of the office application 470 of the PC 130 proceeds to step S1210. In other words, the UI 1400 including the button 1401 is functionally operable as a processing flow execution screen.

According to the example illustrated in FIG. 16, the button 1401 enables a user to execute the processing flow whose processing flow name is "business form data transmission." The name associated with the button 1401 corresponds to the processing flow name included in the processing flow information identified in step S1303.

As mentioned above, when the office application 470 opens the document data, the office application 470 displays only one processing flow execution button on the task pane 703. Therefore, a user is simply required to press the only one button displayed on the task pane 703 after completing editing and confirmation processing to be performed on the document data. The following processing can be automatically executed in a desired manner.

A button 1402 is a button that is operable to terminate the office application 470. The office application 470 performs predetermined processing when a user presses the button 1402 via the pointing device 308, as described below with reference to FIG. 17.

Figure 17:
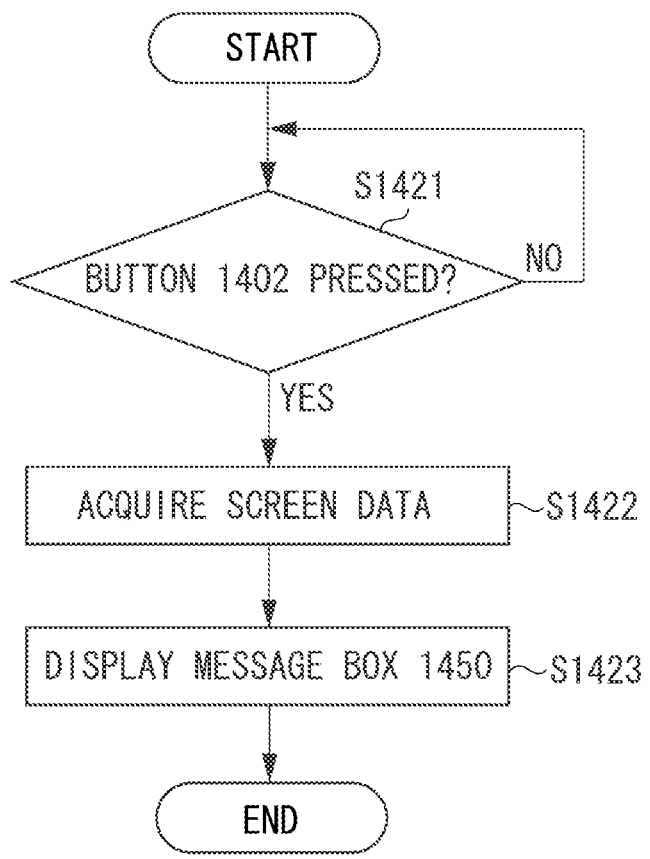
FIG. 17 is a flowchart illustrating an example of processing that can be performed by the PC.

FIG. 17 is a flowchart illustrating an example of the processing that can be performed by the office application 470 when a user presses the button 1402 via the pointing device 308.

In step S1421, the document data cooperation unit 472 of the office application 470 monitors whether the button 1402 has been pressed by a user via the input apparatus 304. If the document data cooperation unit 472 detects that the button 1402 has been pressed (YES in step S1421), the operation proceeds to step S1422. If the pressing of the button 1402 is not detected (No in step S1421), the document data cooperation unit 472 continuously performs the monitoring processing.

In step S1422, the document data cooperation unit 472 of the office application 470 acquires the screen data from the processing flow extended application 450. More specifically, the document data cooperation unit 472 sends a request deriving from the pressing of the button 1402 to the processing flow extended application 450. In response to the request, the processing flow extended application 450 generates screen data that includes JavaScript data, which is necessary to display a message box 1450. The message box 1450 is described in detail below with reference to FIG. 18.

Then, the processing flow extended application 450 transmits a response including the generated screen data to the office application 470. The document data cooperation unit 472 of the office application 470 receives the response including the screen data. Then, the operation proceeds to step S1422.

In step S1423, the office application 470 displays the message box 1450 and terminates the processing of the flowchart illustrated in FIG. 17. More specifically, the document data cooperation unit 472 analyzes the JavaScript data included in the screen data of the response and displays the message box 1450.

FIG. 18 illustrates an example of the message box 1450, which enables a user to confirm whether to execute the processing flow.

The message box 1450 includes a button 1451 and a button 1452. Further, the message box 1450 is a confirmation screen that includes a confirmation message inquiring whether to execute the processing flow.

The button 1451 is a button that is operable to execute the processing flow. If a user presses the button 1451 via the pointing device 308, the office application 470 performs predetermined processing that is similar to the processing to be performed when the button 1401 is pressed. More specifically, the operation of the office application 470 proceeds to step S1210.

The button 1452 is a button that is operable to cancel the execution of the processing flow. If a user presses the button 1452 via the pointing device 308, the office application 470 terminates the processing without executing the processing flow.

FIG. 19A illustrates another example of the UI that can be displayed by the office application 470 in step S1209. The UI illustrated in FIG. 19A is different from the UI illustrated in FIG. 16 as described below. The UI illustrated in FIG. 19A is an example of a completion screen that indicates the completion of the processing flow.

In FIG. 19A, a UI 1500 includes a task pane that displays the screen data generated by the UI generation unit 453 of the processing flow extended application 450 in step S1307.

A message 1501 is a message notifying the completion of the processing flow. Further, the message 1501 can notify the deletion of the processing flow ID if the processing flow ID has been deleted from the document data. In this case, the office application 470 deletes the processing flow ID from the document data by executing the processing flow ID deletion command added in step S1308 when the office application 470 displays the UI 1500.

More specifically, the document data cooperation unit 472 analyzes the processing flow ID deletion command included in the document data and requests the document data editing unit 471 to delete the processing flow ID. The document data editing unit 471 deletes the processing flow ID embedded in the document data. For example, if the processing target data is the document data 1100, the document data editing unit 471 deletes the tag 1103.

A button 1502 is a button that is operable to terminate the processing flow extended application 450. If a user presses the button 1502 via the pointing device 308, the office application 470 terminates the processing flow extended application 450. In this case, for example, the office application 470 can close (stop displaying) the task pane.

FIG. 19B illustrates another example of the UI that can be displayed by the office application 470 in step S1209. The UI illustrated in FIG. 19B is different from the UI illustrated in FIG. 16 or FIG. 19A as described below.

In FIG. 19B, a UI 1550 includes a task pane that displays the screen data generated by the UI generation unit 453 of the processing flow extended application 450 in step S1309.

A message 1551 is a message notifying that the processing flow is now in progress. A button 1552 is a button that is operable to confirm the status of the processing flow. If a user presses the button 1552 via the pointing device 308, the office application 470 inquires the processing flow extended application 450 about the status of the processing flow. The processing flow extended application 450 generates screen data according to the status and transmits the generated screen data to the office application 470. The office application 470 displays the received screen data. If the status is "in progress", the office application 470 displays the task pane of the UI 1550 again. If the status is "completed", the office application 470 displays the task pane of the UI 1500.

Figure 19C:
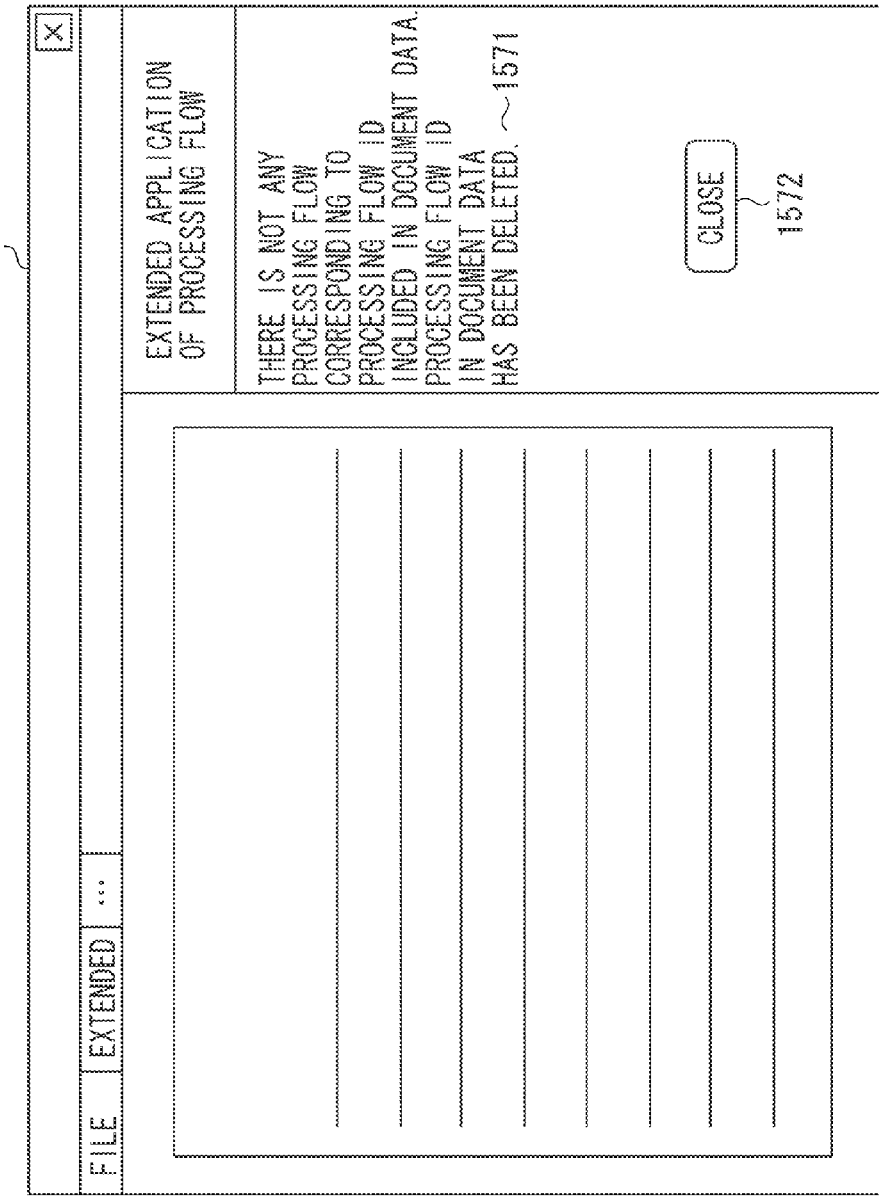

FIG. 19C illustrates another example of the UI that can be displayed by the office application 470 in step S1209. The UI illustrated in FIG. 19C is different from the UI illustrated in FIG. 16, FIG. 19A, or FIG. 19B.

In FIG. 19C, a UI 1570 includes a task pane that displays the screen data generated by the UI generation unit 453 of the processing flow extended application 450 in step S1310.

A message 1571 is a message notifying that the processing flow ID embedded in the document data is not included in the processing flow information that is managed by the processing flow management server apparatus 120. Further, the message 1571 can notify the deletion of the processing flow ID if the processing flow ID has been deleted from the document data. In this case, the office application 470 deletes the processing flow ID from the document data by executing the processing flow ID deletion command added in step S1311 when the office application 470 displays the UI 1570.

A button 1572 is a button that is operable to terminate the processing flow extended application 450. If a user presses the button 1572 via the pointing device 308, the office application 470 terminates the processing flow extended application 450.

As described above, the office application 470 of the PC 130 displays the UI in step S1209.

Referring back to FIG. 14, if a user presses the button 1401 or the button 1451 via the pointing device 308, the operation of the office application 470 of the PC 130 proceeds to step S1210.

In step S1210, the office application 470 of the PC 130 acquires the document data by executing the command added in step S1305. More specifically, the office application 470 receives a pressing of the button 1401 or 1451 via the pointing device 308. The document data cooperation unit 472 analyzes the command and sends a document data acquisition request to the document data editing unit 471. According to the request, the document data editing unit 471 acquires the document data.

In step S1211, the office application 470 of the PC 130 transmits the processing flow execution request to the processing flow extended application 450. In other words, the office application 470 of the PC 130 performs request transmission processing. The execution request to be transmitted in this case includes the document data acquired in step S1210 and processing flow ID tied to the document data.

In step S1212, the processing flow extended application 450 of the processing flow management server apparatus 120 receives the execution request. In other words, the processing flow extended application 450 of the processing flow management server apparatus 120 performs request reception processing. The processing flow application 420 executes the processing flow.

In this case, the processing to be performed in step S1212 is described in detail below with reference to FIG. 20.

Figure 20A:
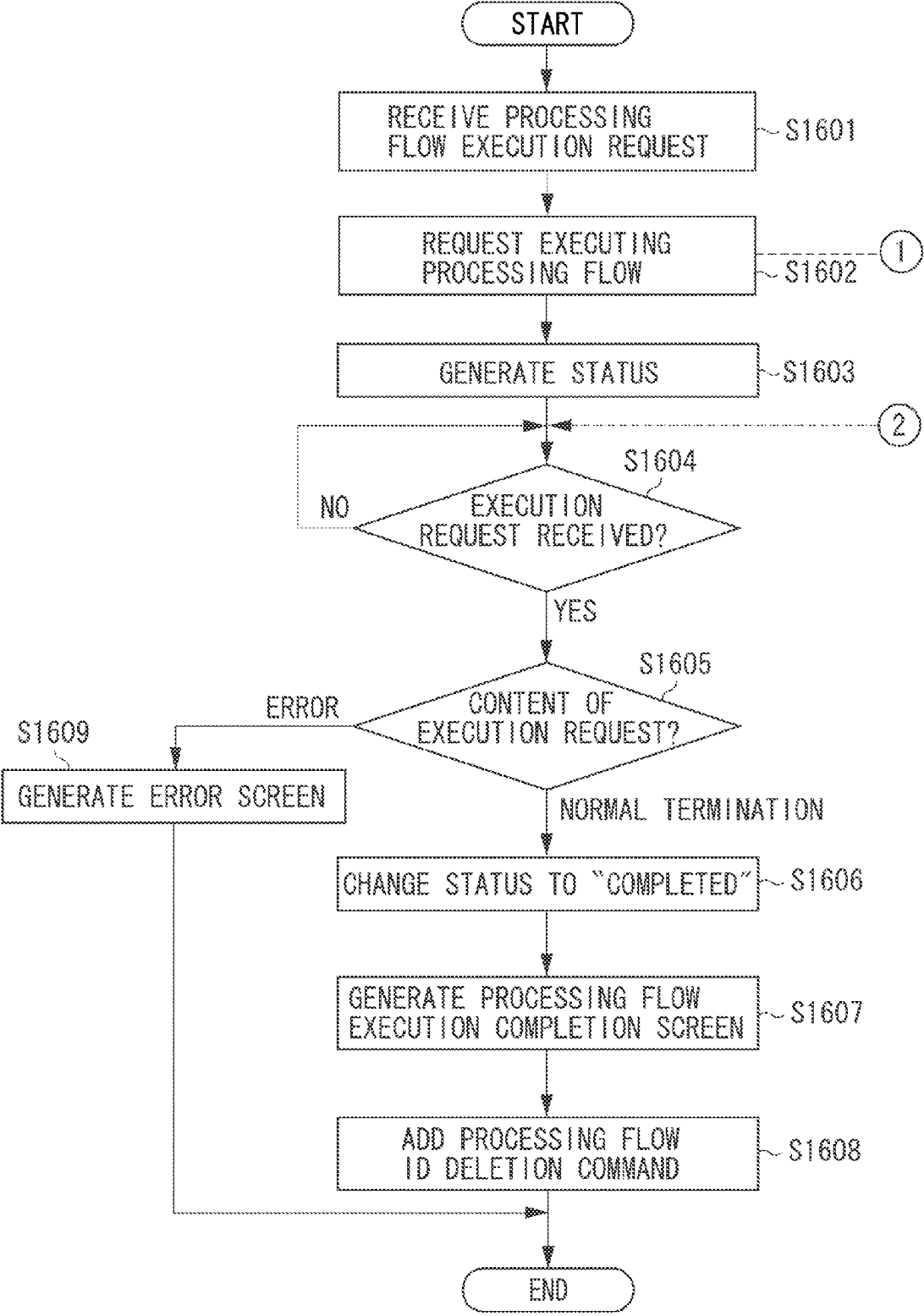

FIG. 20 is a flowchart illustrating an example of the processing to be performed in step S1212, in which processing of steps S1601 to S1609 can be performed by the processing flow extended application 450 and processing of steps S1651 to S1660 can be performed by the processing flow application 420. In step S1601, the communication unit 451 receives the processing flow execution request. Then, the operation proceeds to step S1602. The processing flow execution request received by the communication unit 451 in step S1601 is the execution request transmitted by the office application 470 of the PC 130 in step S1211. Therefore, the execution request includes the document data. Further, the document data includes the processing flow ID.

In step S1602, the control unit 452 transmits the processing flow execution request to the processing flow application 420 via the communication unit 451. Then, the operation proceeds to step S1603. The processing flow execution request includes the document data included in the execution request that the communication unit 451 has received in step S1601.

In step S1603, the status management unit 454 adds a record in the status management list 620. More specifically, the status management unit 454 adds the processing flow ID included in the processing flow execution request and the status information "in progress" to the columns 621 and 622. Then, the operation of the status management unit 454 proceeds to step S1604.

In step S1604, the control unit 452 monitors whether a processing flow execution result has been received in response to the request that the processing flow application 420 has transmitted in step S1602. If the control unit 452 determines that the execution result has been received (YES in step S1604), the operation proceeds to step S1605. On the other hand, if it is determined that the execution result has not been received (NO in S1604), the control unit 452 continuously performs the monitoring processing.

In step S1605, the control unit 452 confirms the execution result received in step S1604. If the control unit 452 determines that the execution result is "normal termination", the operation proceeds to step S1606. On the other hand, if the control unit 452 determines that the execution result is "error", the operation proceeds to step S1609.

In step S1606, the status management unit 454 changes the value of the column 622 of the record added in the status management list 620 in step S1603 to "completed." Then, the operation proceeds to step S1607.

In step S1607, the UI generation unit 453 generates a screen that notifies that the processing flow has been completed. Then, the operation proceeds to step S1608. The processing flow completion notification screen to be generated by the UI generation unit 453 in step S1607 is similar to the screen generated by the UI generation unit 453 in step S1307.

In step S1608, the UI generation unit 453 adds a command to delete the processing flow ID embedded in the document data to the screen data generated in step S1607. Then, the UI generation unit 453 terminates the processing of the flowchart illustrated in FIG. 20.

In step S1609, the UI generation unit 453 generates an error screen and terminates the processing of the flowchart illustrated in FIG. 20. The above-mentioned contents are processing to be performed by the processing flow extended application 450 in step S1212. Next, processing to be performed by the processing flow application 420 is described in detail below.

As mentioned above, the processing flow application 420 performs the processing in steps S1651 to S1660 illustrated in FIG. 20.

In step S1651, the processing flow control unit 422 monitors whether the processing flow execution request has been received. The processing flow execution request to be monitored in step S1651 is the processing flow execution request that the processing flow extended application 450 has transmitted in step S1602. If the processing flow control unit 422 has received the processing flow execution request (YES in step S1651), the operation proceeds to step S1652. On the other hand, if it is determined that the processing flow execution request has not been received (NO in step S1651), the processing flow control unit 422 continuously performs the monitoring processing.

In step S1652, the processing flow management unit 423 compares the processing flow ID included in the execution request with the column 621 of the processing flow management list 600 to search for a coincident record. Then, the operation proceeds to step S1653.

In step S1653, the processing flow management unit 423 determines whether there is any processing flow having been found as a result of the search performed in step S1652. If it is determined that the coincident record has been found (YES in step S1653), the processing flow management unit 423 sends the processing flow definition file of the column 604 to the processing flow control unit 422. Then, the operation proceeds to step S1654. On the other hand, if the processing flow management unit 423 determines that the coincident record has not been found (NO in step S1653), the operation proceeds to step S1660.

In step S1654, the processing flow control unit 422 analyzes the processing flow and divides the processing flow into a plurality of tasks. Then, the operation proceeds to step S1655.

In step S1655, the processing flow control unit 422 requests the task execution unit 426 to execute the processing of the divided task on the document data included in the processing flow execution request. The task execution unit 426 executes the requested task. Then, the operation proceeds to step S1656. The task that the processing flow control unit 422 requests the task execution unit 426 to execute in step S1655 is the task to be executed by the processing flow application 420. Although not illustrated in the drawings, the processing flow control unit 422 manages the task that the processing flow application 420 can execute. For example, in the processing flow definition file 900, tasks indicated by the tag 909 and the tag 910 are the tasks that the processing flow application 420 can execute.

In step S1656, the processing flow control unit 422 determines whether the task executed by the task execution unit 426 has been normally terminated. If the processing flow control unit 422 determines that the termination is normal (YES in step S1656), the operation proceeds to step S1657. On the other hand, if the processing flow control unit 422 determines that the termination is not normal (NO in step S1656), the operation proceeds to step S1660.

In step S1657, the processing flow control unit 422 determines whether the processing flow application 420 has completed all of the tasks to be executed. If the processing flow control unit 422 determines that all of the tasks has been completed (YES in step S1657), the operation proceeds to step S1658. On the other hand, if the processing flow control unit 422 determines that all of the tasks has not been completed yet (NO in step S1657), the operation returns to step S1655.

For example, according to the processing flow definition file 900, the processing flow control unit 422 determines that all of the tasks to be executed has been completed if the image processing task defined by the tag 909 and the transmission task to the document management server apparatus 150 defined by the tag 910 have been completed. As mentioned above, the document data can be stored in a target storing destination by causing the processing flow extended application 450 and the processing flow application 420 to cooperatively execute the processing flow.

In step S1658, the processing flow control unit 422 sets "normal termination" as an execution result of the processing flow. Then, the operation proceeds to step S1659.

In step S1659, the communication unit 421 transmits the execution result to the processing flow extended application 450. Then, the communication unit 421 terminates the processing of the flowchart illustrated in FIG. 20.

In step S1660, the processing flow control unit 422 sets "error" as an execution result of the processing flow. Then, the operation proceeds to step S1659.

The processing flow application 420 performs the above-mentioned processing in step S1212.

Referring back to FIG. 14, in step S1213, the processing flow extended application 450 of the processing flow management server apparatus 120 transmits the screen data generated in step S1211 to the processing flow application 420. Then, the processing flow application 420 receives the screen data. In other words, the processing flow application 420 performs screen data reception processing.

If the screen data transmission in step S1213 has been normally completed, then in step S1214, the processing flow extended application 450 of the processing flow management server apparatus 120 deletes the status information of the processing flow. More specifically, the status management unit 454 of the processing flow extended application 450 compares the processing flow ID of the processing flow executed in step S1212 with the column 621 of the status management list 620 to identify the status information of the corresponding processing flow.

The status management unit 454 can delete the status information of the processing flow by deleting the identified record from the status management list 620. In the present exemplary embodiment, the processing flow extended application 450 can be configured to cancel the processing to be executed in step S1214 when the screen data transmission in step S1213 has not been normally terminated, for example, because the office application 470 is already terminated.

In step S1215, the office application 470 of the PC 130 displays the screen data received in step S1213 on task pane. If the processing flow extended application 450 is the screen data generated in step S1607, the UI of the office application 470 to be displayed by the office application 470 in step S1215 is the UI 1500.

As mentioned above, according to the present exemplary embodiment, a processing flow ID is embedded into document data when the MFP 110 executes a processing flow. Then, the office application 470 of the PC 130 extracts the processing flow ID from the document data via the processing flow extended application 450. Further, the office application 470 of the PC 130 displays a button that is operable to execute a processing flow relating to processing flow information tied to the processing flow ID identified with reference to the management list, which is currently managed by the processing flow management server apparatus 120. Accordingly, a user is simply required to press the only one button displayed together with the document data and the processing can be performed in a desired manner. Therefore, the present exemplary embodiment can improve the user operability even in a case where the processing flow requires a user work to be performed before the processing is completed.

<Other Exemplary Embodiment(s)>
Further, the present subject matter can be realized by executing the following processing. More specifically, the processing includes providing a software program that can realize the above-mentioned functions of the exemplary embodiments to a system or an apparatus via a network or an appropriate storage medium and causing a computer (or a CPU or a micro-processing unit (MPU)) of the system or the apparatus to read and execute the program.

As mentioned above, according to each of the exemplary embodiments, the user operability can be improved even in a case where the processing flow requires a user work to be performed before the processing is completed.

Although the present subject matter has been described based on some preferred embodiments, the present subject matter is not limited to any specific exemplary embodiment and can be modified and changed in various ways within the scope of the present subject matter defined by the following claims.

Effects

According to the present subject matter, document data including identification information to be referred to in identifying a processing flow is received beforehand from an image processing apparatus. Therefore, it is feasible to request executing the processing flow based on the identification information included in the document data. Therefore, for example, a user is not required to select the document data and the processing flow before executing the processing flow.

Other Embodiments

Embodiments of the present subject matter can also be realized by a computer of a system or apparatus that reads out and executes computer executable instructions recorded on a storage medium (e.g., non-transitory computer-readable storage medium) to perform the functions of one or more of the above-described embodiment(s) of the present subject matter, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present subject matter has been described with reference to exemplary embodiments, it is to be understood that the subject matter is not limited to the disclosed exemplary embodiments. The scope of the following claims is to be accorded the broadest interpretation so as to encompass all such modifications and equivalent structures and functions.

This application claims the benefit of Japanese Patent Application No. 2013-107343 filed May 21, 2013, which is hereby incorporated by reference herein in its entirety.

What is claimed is:

1. A system including an image processing apparatus, a server apparatus, and an information processing apparatus,
the image processing apparatus comprising:
an embedding unit configured to embed identification information in document data read by the image processing apparatus, in which the identification information can be referred to in identifying a processing flow including a plurality of pieces of processing to be performed on the document data,
the server apparatus comprising:
a management unit configured to manage list information that associates the identification information with processing flow information corresponding to the processing flow,
the information processing apparatus comprising:
a reception unit configured to receive the document data in which the identification information is embedded from the image processing apparatus, and a transmission unit configured to transmit an execution request of the processing flow that includes the identification information and the document data, to the server apparatus, and
the server apparatus further comprising:
an execution unit configured to execute a processing flow that corresponds to processing flow information associated with the identification information included in the execution request, of the processing flow information included in the list information.

2. The system according to claim 1, further comprising:
an extraction unit configured to extract the identification information using an extended application launched on an application that can edit the document data,
wherein the transmission unit is configured to transmit the execution request together with the document data to the server apparatus, using the extended application.

3. The system according to claim 1, further comprising:
a second reception unit configured to receive screen data that relates to the processing flow identified based on the identification information; and
a display unit configured to display an execution screen to execute the processing flow, based on the screen data.

4. The system according to claim 3, wherein the display unit is configured to display a confirmation screen that includes a message confirming whether to execute the processing flow, if an execution screen closing instruction is received before receiving a selection to execute the processing flow, via the execution screen.

5. The system according to claim 3, wherein the display unit is configured to display a completion screen of the processing flow that includes a message to delete the identification information from the document data, if the execution of the processing flow is completed.

6. A method for controlling a system that includes an image processing apparatus, a server apparatus, and an information processing apparatus, wherein
processing to be performed by the image processing apparatus comprises:
embedding identification information in document data read by the image processing apparatus, in which the identification information can be referred to in identifying a processing flow including a plurality of pieces of processing to be performed on the document data,
processing to be performed by the server apparatus comprises:
managing list information that associates the identification information with processing flow information corresponding to the processing flow,
processing to be performed by the information processing apparatus comprises:
receiving the document data in which the identification information is embedded from the image processing apparatus, and transmitting an execution request of the processing flow that includes the identification information and the document data, to the server apparatus, and
the processing to be performed by the server apparatus further comprises:
executing a processing flow that corresponds to processing flow information associated with the identification information included in the execution request, of the processing flow information included in the list information.

7. The system control method according to claim 6, further comprising:
extracting the identification information using an extended application launched on an application that can edit the document data,
wherein the transmitting includes an operation to transmit the execution request together with the document data to the server apparatus, using the extended application.

8. The system control method according to claim 6, further comprising:
second receiving of screen data that relates to the processing flow identified based on the identification information; and
displaying an execution screen to execute the processing flow, based on the screen data.

9. The control method according to claim 8, wherein the displaying includes an operation to display a confirmation screen that includes a message confirming whether to execute the processing flow, if an execution screen closing instruction is received before receiving a selection to execute the processing flow, via the execution screen.

10. The control method according to claim 8, wherein the displaying includes an operation to display a completion screen of the processing flow that includes a message to delete the identification information from the document data, if the execution of the processing flow is completed.

* * * * *